(12) United States Patent
Go et al.

(10) Patent No.: US 12,587,972 B2
(45) Date of Patent: Mar. 24, 2026

(54) METHOD FOR REPORTING POWER HEADROOM IN WIRELESS COMMUNICATION SYSTEM AND DEVICE THEREFOR

(71) Applicant: LG ELECTRONICS INC., Seoul (KR)

(72) Inventors: Seongwon Go, Seoul (KR); Jiwon Kang, Seoul (KR); Haewook Park, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 18/030,437

(22) PCT Filed: Oct. 8, 2021

(86) PCT No.: PCT/KR2021/013925
§ 371 (c)(1),
(2) Date: Apr. 5, 2023

(87) PCT Pub. No.: WO2022/075814
PCT Pub. Date: Apr. 14, 2022

(65) Prior Publication Data
US 2023/0379843 A1 Nov. 23, 2023

(30) Foreign Application Priority Data

Oct. 8, 2020 (KR) ........................ 10-2020-0130082

(51) Int. Cl.
*H04W 52/36* (2009.01)
*H04W 52/38* (2009.01)
*H04W 72/231* (2023.01)

(52) U.S. Cl.
CPC ......... *H04W 52/365* (2013.01); *H04W 52/38* (2013.01); *H04W 72/231* (2023.01)

(58) Field of Classification Search
CPC . H04W 52/36; H04W 52/365; H04W 72/231; H04W 52/38
See application file for complete search history.

(56) References Cited

U.S. PATENT DOCUMENTS 9,867,147 B2 * 1/2018 Pelletier ................ H04W 52/42
10,383,067 B2 * 8/2019 Lin ..................... H04W 52/367
(Continued)

FOREIGN PATENT DOCUMENTS

EP 3313129 A1 * 4/2018 .......... H04W 52/367
EP 3917221 B1 * 8/2024 .......... H04W 52/146
(Continued)

OTHER PUBLICATIONS

R1-2006951, 3GPP TSG RAN WG1 #102-e, e-Meeting, Aug. 17-Aug. 28, 2020, Source: NTT Docomo, Inc., Title: Discussion on multi-beam operation, Agenda Item: 8.1.1, Document for: Discussion and Decision (14 pages).

(Continued)

*Primary Examiner* — Hai V Nguyen
(74) *Attorney, Agent, or Firm* — BRYAN CAVE LEIGHTON PAISNER LLP

(57) ABSTRACT

A method of a user equipment (UE) to report a power headroom (PH) in a wireless communication system includes receiving configuration information related to the power headroom (PH), and transmitting a message for a report of the PH. The report of the PH is triggered based on a pre-configured event, and the message for the report of the PH includes information related to P-MPR (Power management-Maximum Power Reduction). The information related to the P-MPR includes one or more values related to the PH, (Continued)

and the one or more values related to the PH are related to one or more specific indexes.

6 Claims, 20 Drawing Sheets

(56) References Cited

U.S. PATENT DOCUMENTS

| 11,736,986 | B2 * | 8/2023 | Kung | H04W 36/04 |
| | | | | 370/331 |
| 12,015,987 | B2 * | 6/2024 | Zhang | H04L 5/16 |
| 12,022,407 | B2 * | 6/2024 | He | H04W 52/383 |
| 12,063,602 | B2 * | 8/2024 | Huang | H04W 52/34 |
| 12,133,181 | B2 * | 10/2024 | Kung | H04L 5/0048 |
| 12,192,916 | B2 * | 1/2025 | Huang | H04W 52/34 |
| 2012/0207112 | A1 * | 8/2012 | Kim | H04W 52/545 |
| | | | | 370/328 |
| 2015/0245304 | A1 * | 8/2015 | Pelletier | H04W 52/42 |
| | | | | 370/335 |
| 2018/0115957 | A1 * | 4/2018 | Lin | H04W 52/365 |
| 2019/0261289 | A1 | 8/2019 | Raghavan et al. | |
| 2020/0022093 | A1 | 1/2020 | Han et al. | |
| 2020/0037254 | A1 | 1/2020 | Comsa et al. | |
| 2020/0145927 | A1 | 5/2020 | Sun et al. | |
| 2022/0046555 | A1 * | 2/2022 | Khoshnevisan | H04W 52/365 |
| 2022/0210748 | A1 * | 6/2022 | Huang | H04W 52/242 |
| 2022/0217644 | A1 * | 7/2022 | Kung | H04W 52/365 |
| 2022/0217653 | A1 * | 7/2022 | Kung | H04W 52/367 |
| 2022/0225247 | A1 * | 7/2022 | Huang | H04W 52/10 |
| 2022/0353036 | A1 * | 11/2022 | Gao | H04L 5/001 |
| 2023/0262612 | A1 * | 8/2023 | Matsumura | H04W 16/28 |
| | | | | 455/522 |
| 2024/0040520 | A1 * | 2/2024 | Matsumura | H04W 72/231 |
| 2025/0071695 | A1 * | 2/2025 | Huang | H04W 52/10 |

FOREIGN PATENT DOCUMENTS

| WO | WO-2021188764 | A1 * | 9/2021 | H04W 72/535 |
| WO | WO-2021195928 | A1 * | 10/2021 | H04W 52/146 |
| WO | WO-2021207567 | A1 * | 10/2021 | H04L 5/0094 |
| WO | WO-2024073081 | A1 * | 4/2024 | H04W 52/365 |

OTHER PUBLICATIONS

ZTE, "Enhancements on Multi-beam Operation", 3GPP TSG RAN WG1 #110-e, e-Meeting, Aug. 17-28, 2020, R1-2005454.

3GPP, Technical Specification Group Radio Access Network; NR; Medium Access Control (MAC) protocol specification (Release 16), 3GPP TS 38.321 V16.2.1 (Sep. 2020).

* cited by examiner

【FIG. 1】
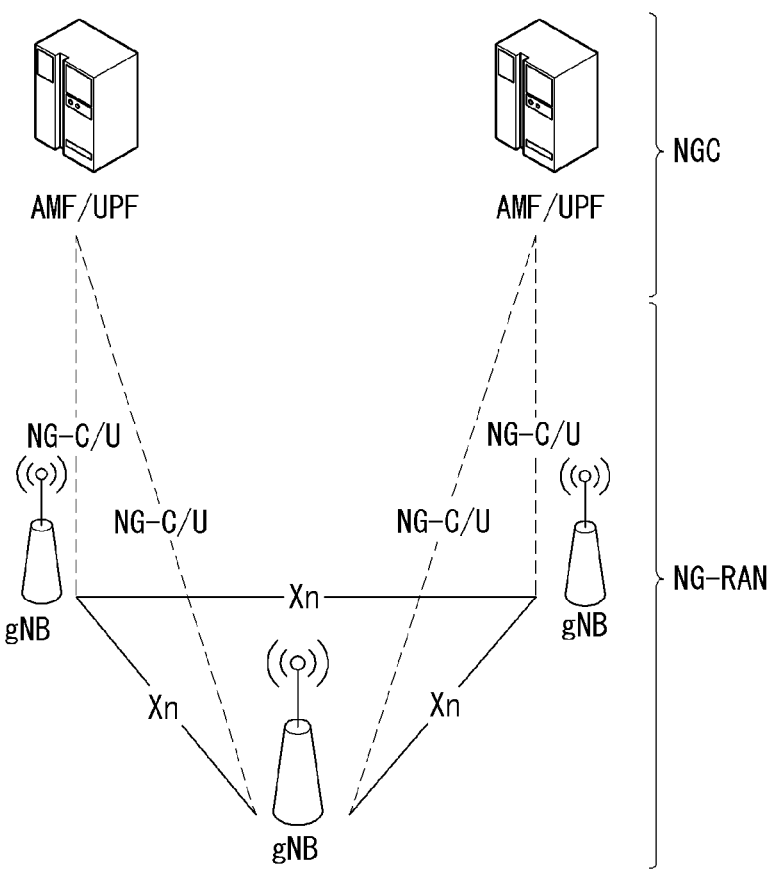
【FIG. 2】
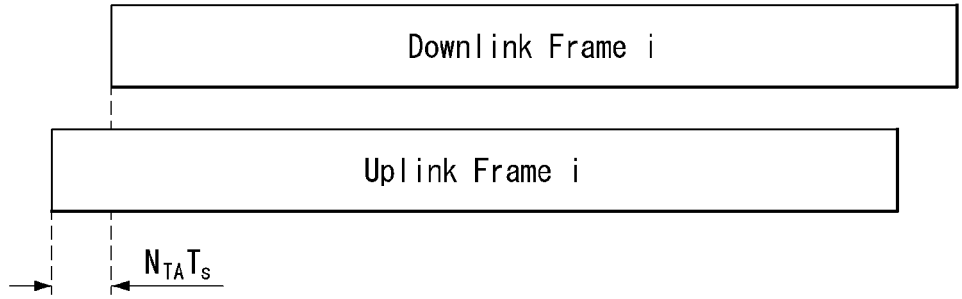

【FIG. 3】
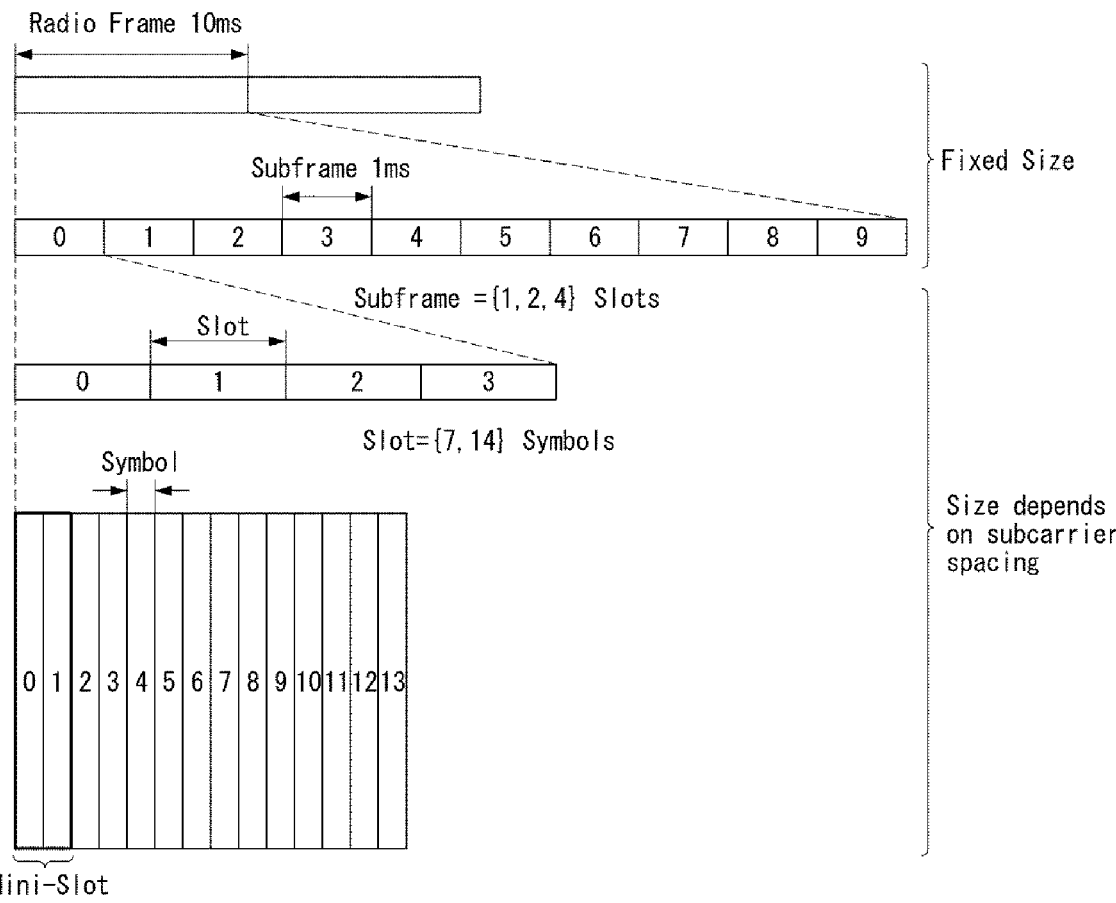

【FIG. 4】
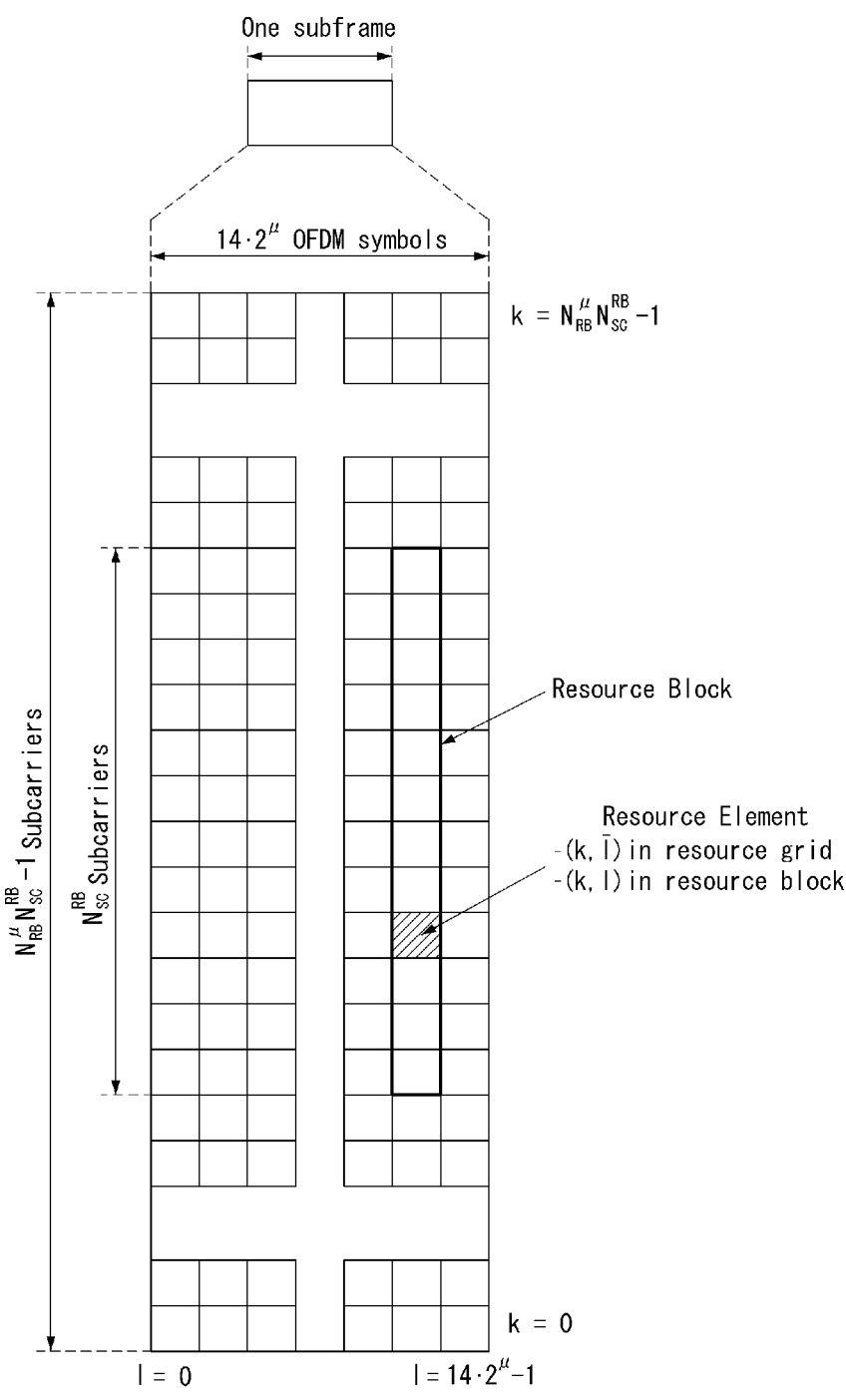

【FIG. 5】

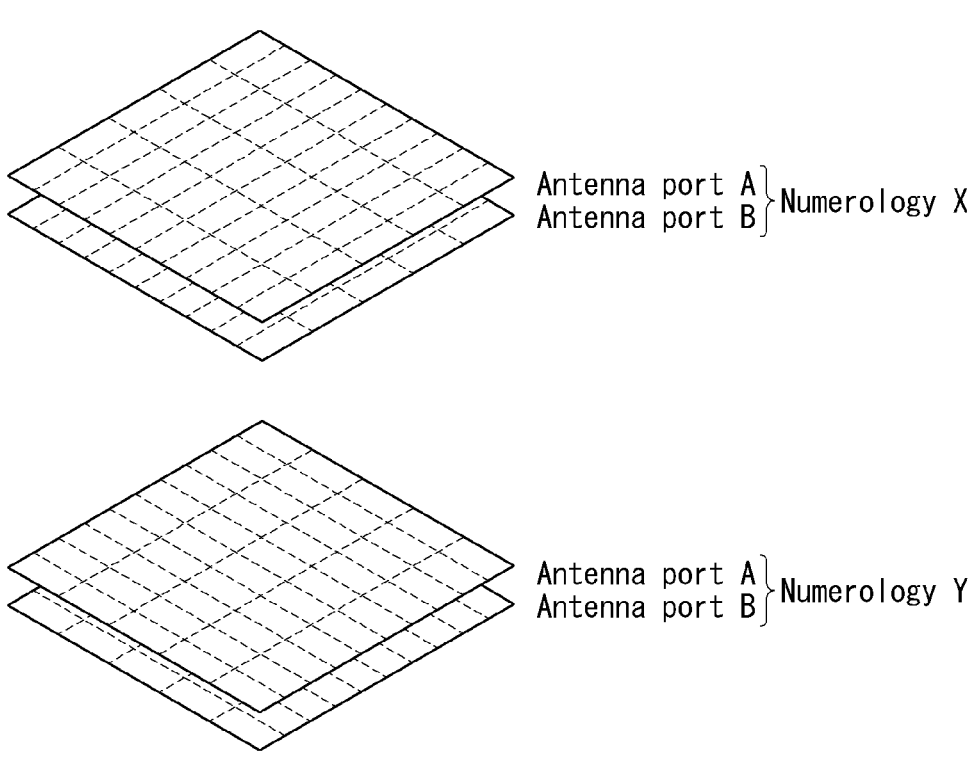

Antenna port A ⎫
Antenna port B ⎬ Numerology X

Antenna port A ⎫
Antenna port B ⎬ Numerology Y

【FIG. 6】

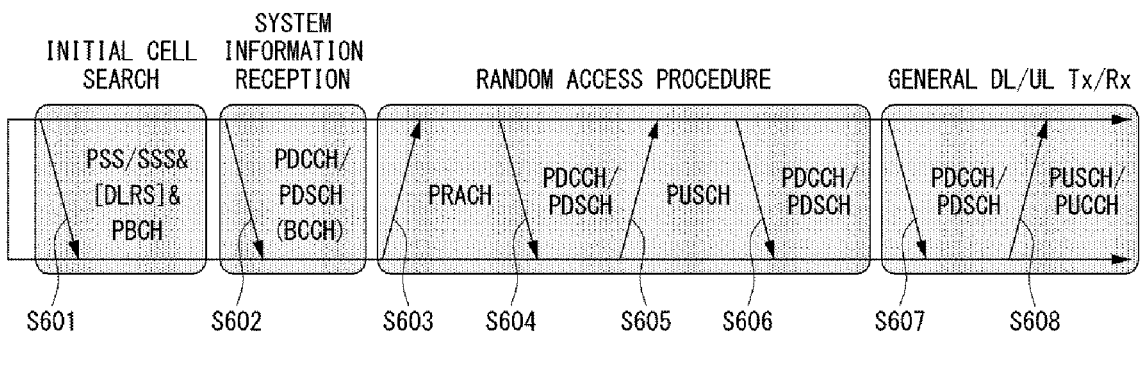

INITIAL CELL SEARCH

SYSTEM INFORMATION RECEPTION

RANDOM ACCESS PROCEDURE

GENERAL DL/UL Tx/Rx

PSS/SSS& [DLRS]& PBCH

PDCCH/ PDSCH (BCCH)

PRACH

PDCCH/ PDSCH

PUSCH

PDCCH/ PDSCH

PDCCH/ PDSCH

PUSCH/ PUCCH

S601      S602      S603      S604      S605      S606      S607      S608

· DL/UL ACK/NACK
· UE CQI/PMI RI REPORT USING PUSCH AND PUCCH

【FIG. 7】
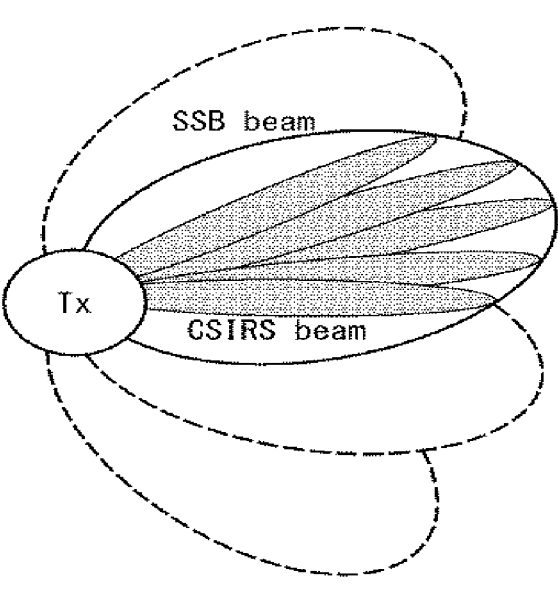
【FIG. 8】
Base station Rx beam sweeping         Base station beam being fixed
UE TX beam (being fixed)         UE Tx beam sweeping
(a)                    (b)

【FIG. 9】
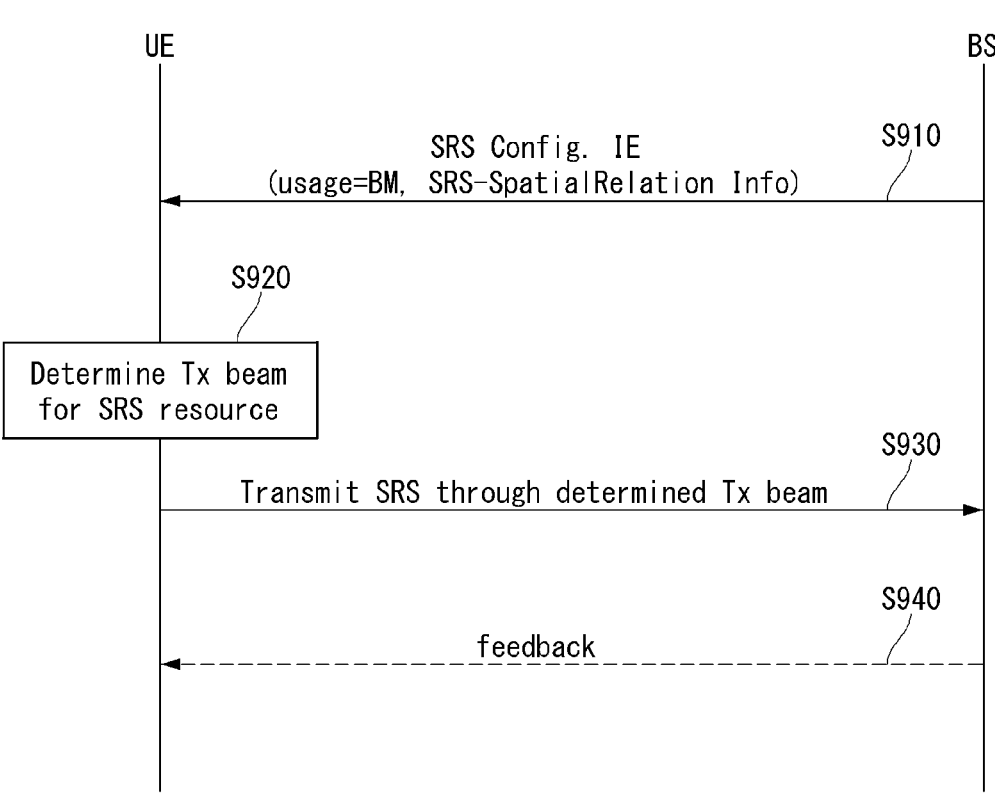

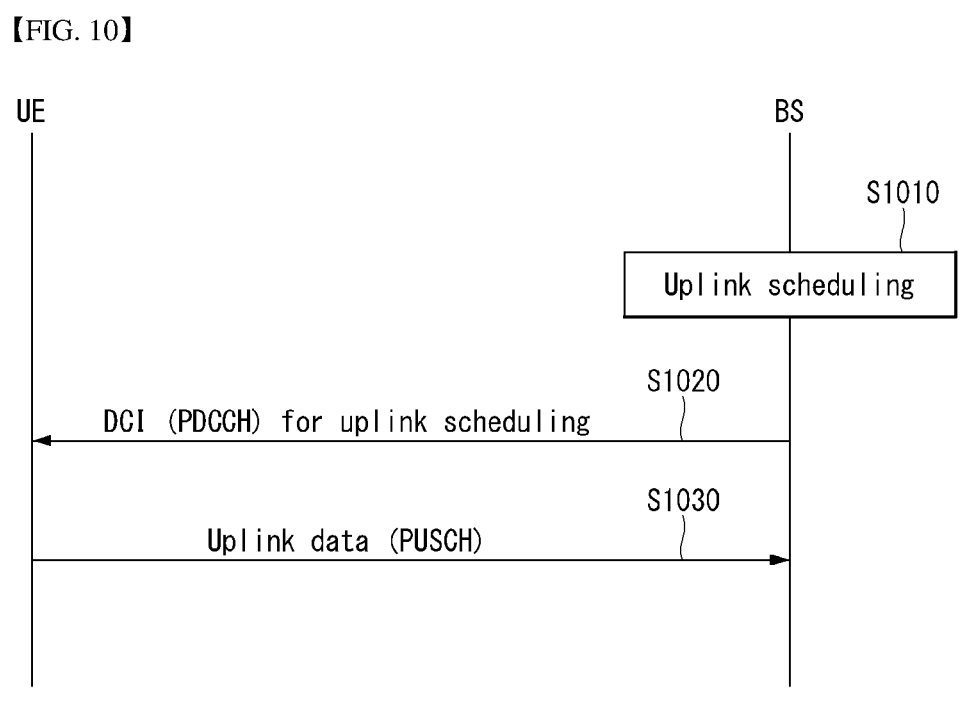

Uplink scheduling

S1020

DCI (PDCCH) for uplink scheduling

S1030

Uplink data (PUSCH)

【FIG. 11】
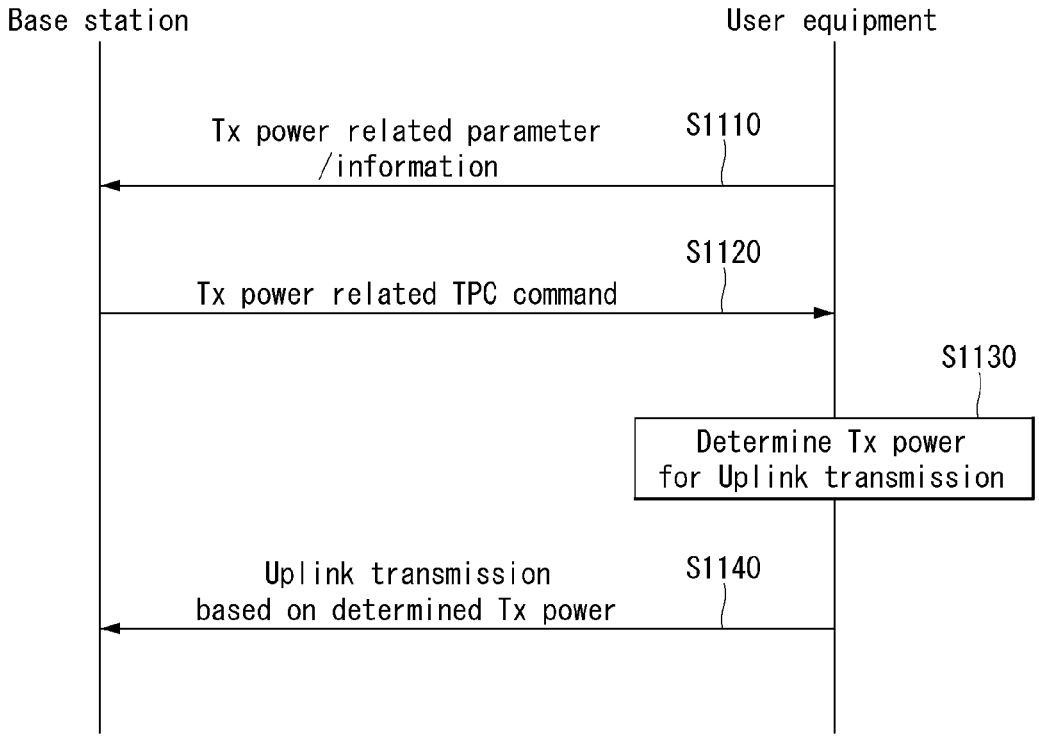
【FIG. 12】
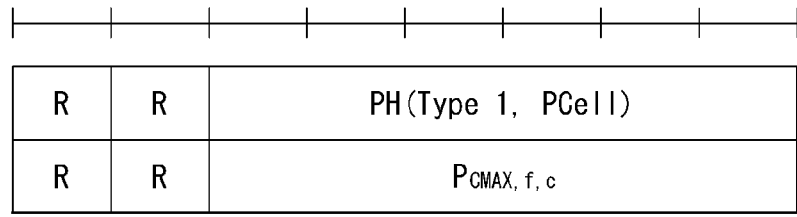

【FIG. 13】

| C7 | C6 | C5 | C4 | C3 | C2 | C1 | R |
|----|----|----|----|----|----|----|----|
| P | V | \multicolumn{6}{l}{PH(Type 2, SpCell of the other MAC entity)} |
| R | R | \multicolumn{6}{l}{$P_{CMAX,f,c}$ 1} |
| P | V | \multicolumn{6}{l}{PH(Type 1, PCell)} |
| R | R | \multicolumn{6}{l}{$P_{CMAX,f,c}$ 2} |
| P | V | \multicolumn{6}{l}{PH(Type X, Serving Cell 1)} |
| R | R | \multicolumn{6}{l}{$P_{CMAX,f,c}$ 3} |

. . .

| | | | | | | | |
|----|----|----|----|----|----|----|----|
| P | V | \multicolumn{6}{l}{PH(Type X, Serving Cell n)} |
| R | R | \multicolumn{6}{l}{$P_{CMAX,f,c}$ m} |

【FIG. 14】

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH(Type 2, SpCell of the other MAC entity) | | | | | |
| R | R | $P_{CMAX,f,c}$ 1 | | | | | |
| P | V | PH(Type 1, PCell) | | | | | |
| R | R | $P_{CMAX,f,c}$ 2 | | | | | |
| P | V | PH(Type X, Serving Cell 1) | | | | | |
| R | R | $P_{CMAX,f,c}$ 3 | | | | | |

. . .

| P | V | PH(Type X, Serving Cell n) | | | | | |
|---|---|---|---|---|---|---|---|
| R | R | $P_{CMAX,f,c}$ m | | | | | |

【FIG. 15】
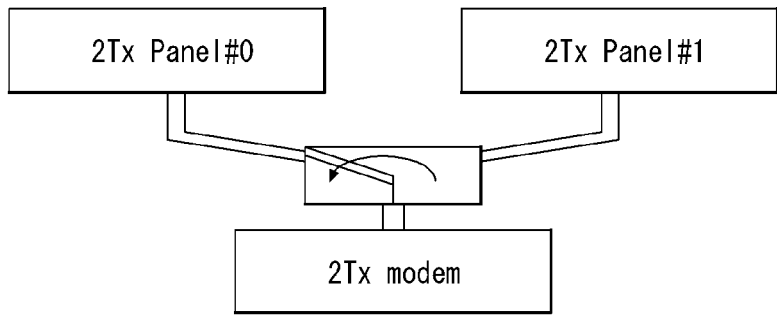
【FIG. 16】
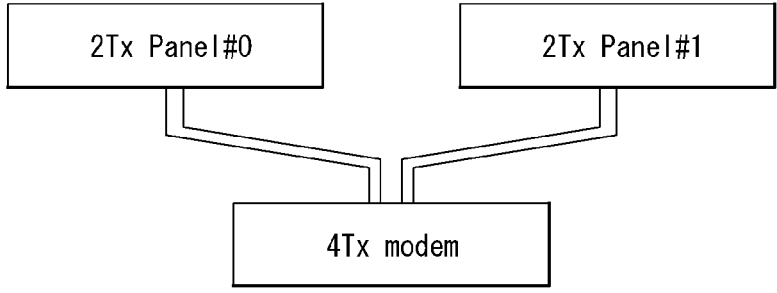

【FIG. 17】
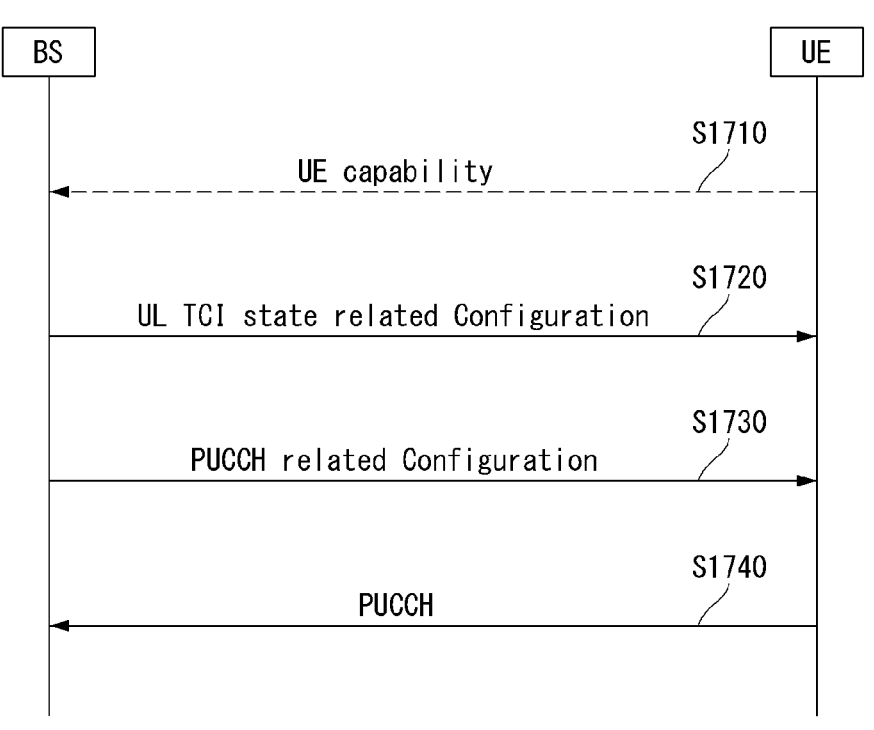

【FIG. 18】
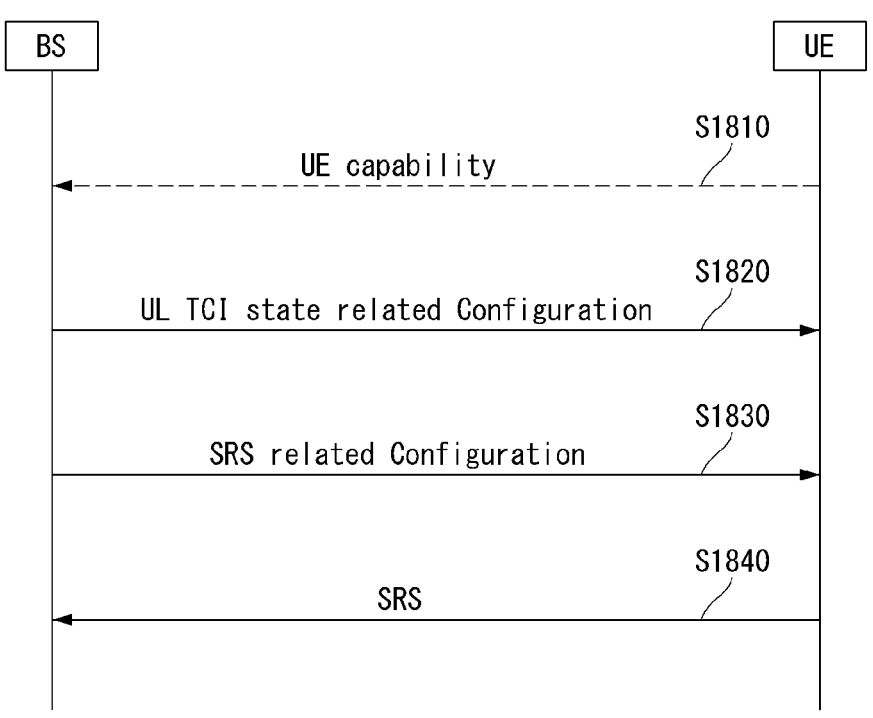

【FIG. 19】
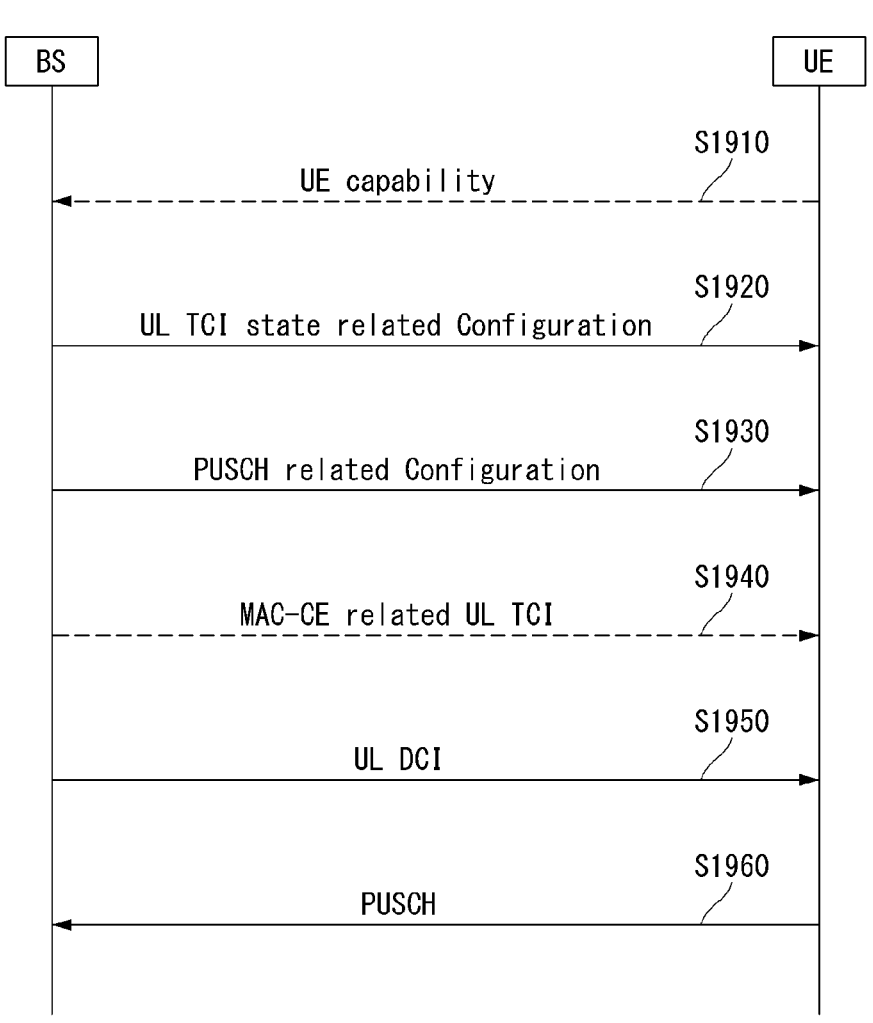

【FIG. 20】
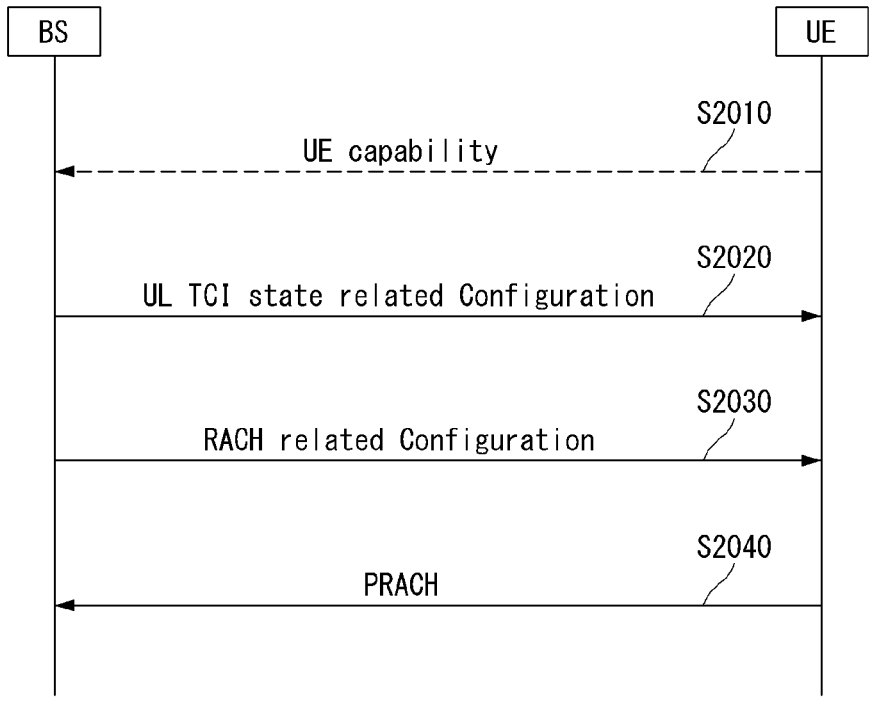
【FIG. 21】
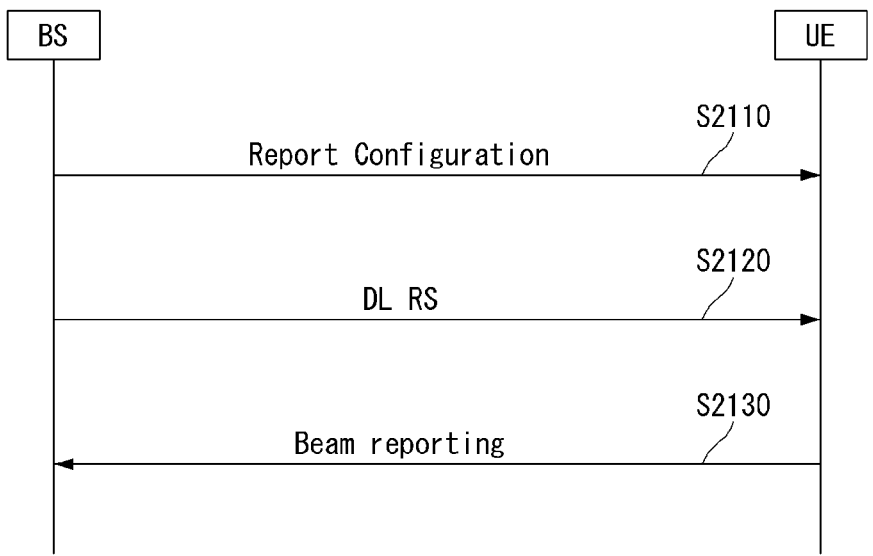

【FIG. 22】
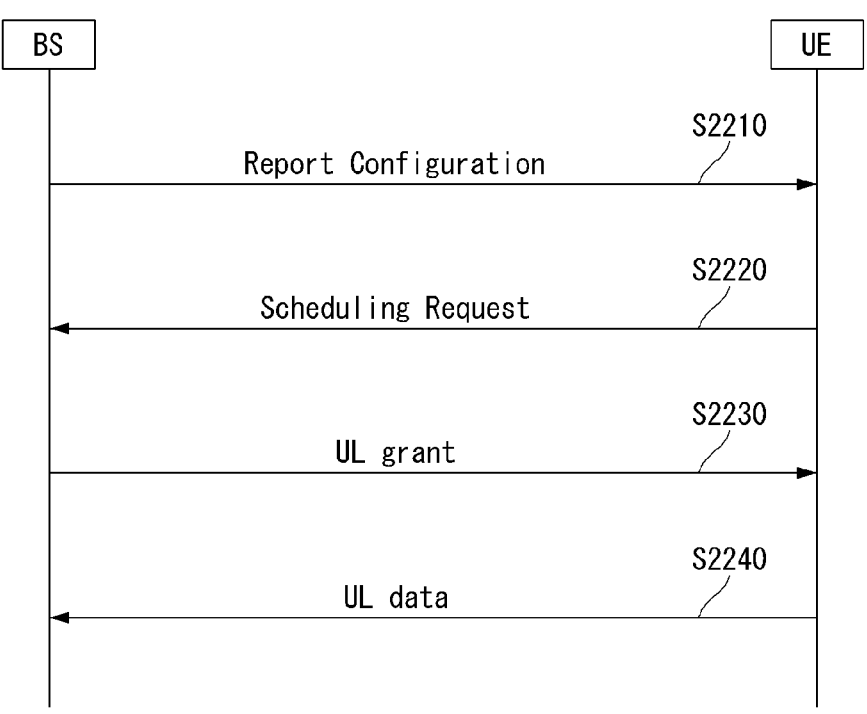

【FIG. 23】
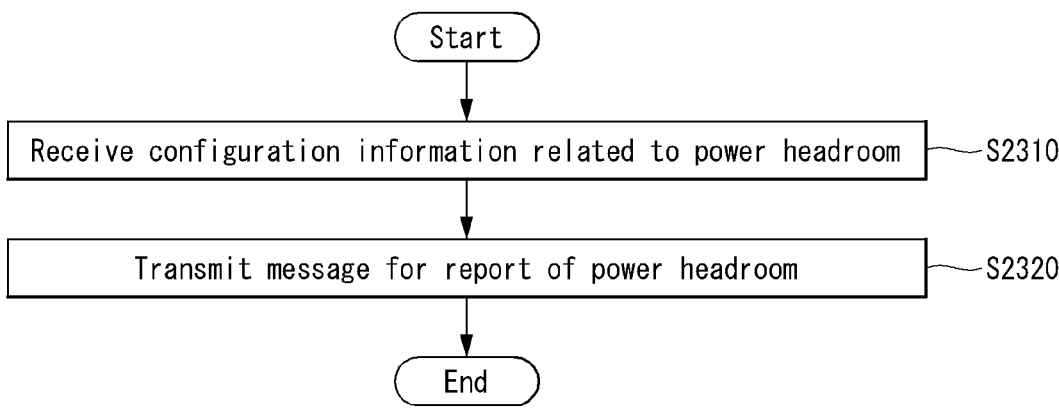
【FIG. 24】
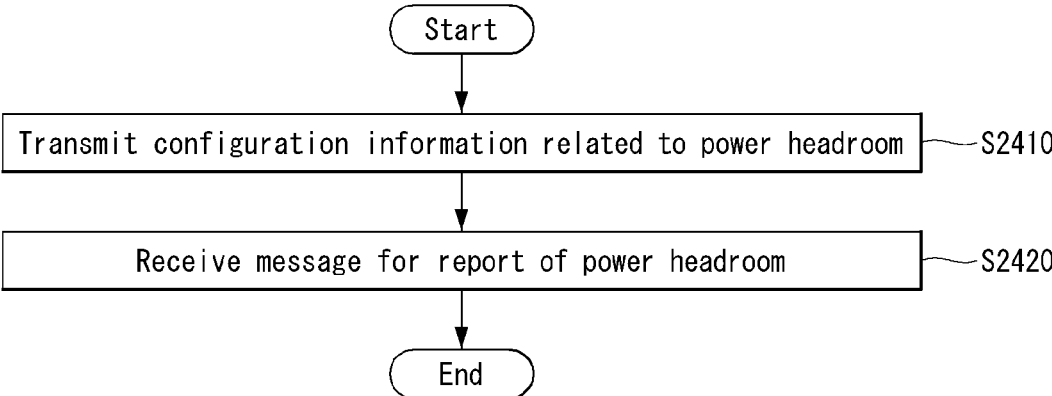

【FIG. 25】
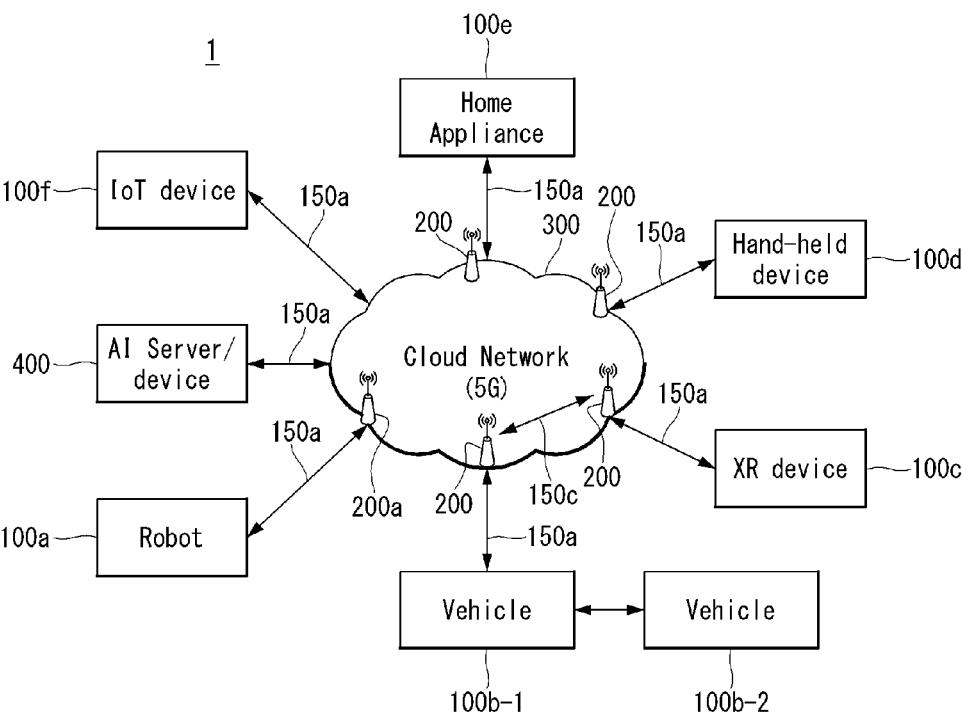
【FIG. 26】
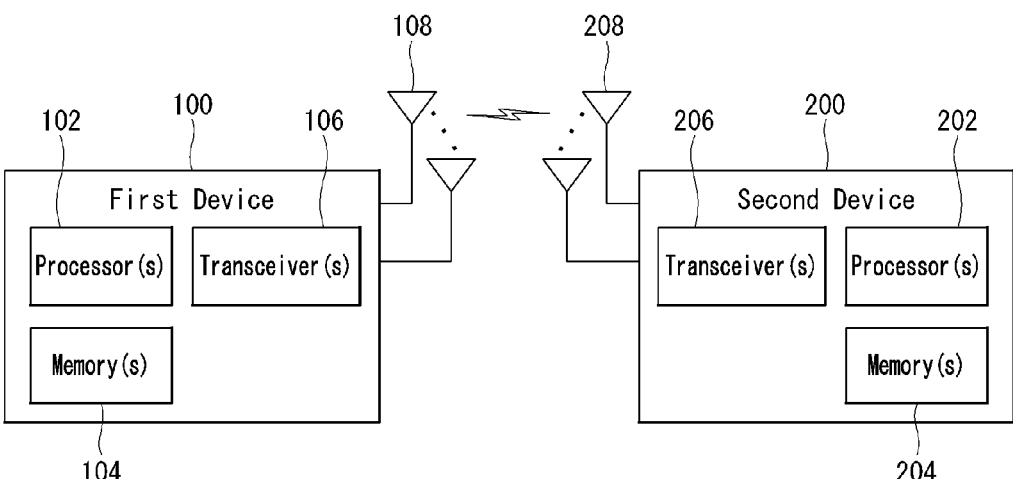

【FIG. 27】
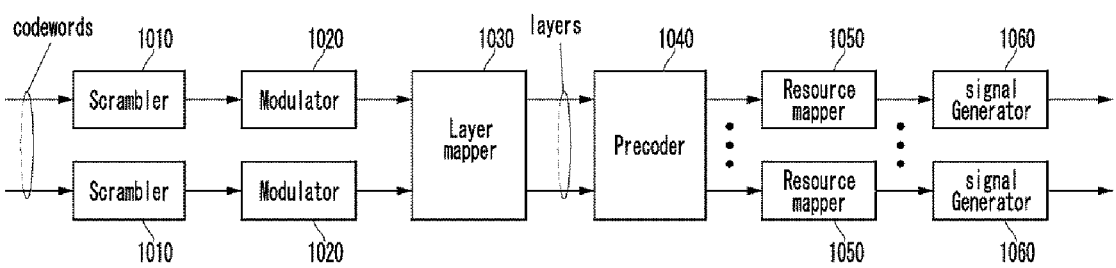
【FIG. 28】
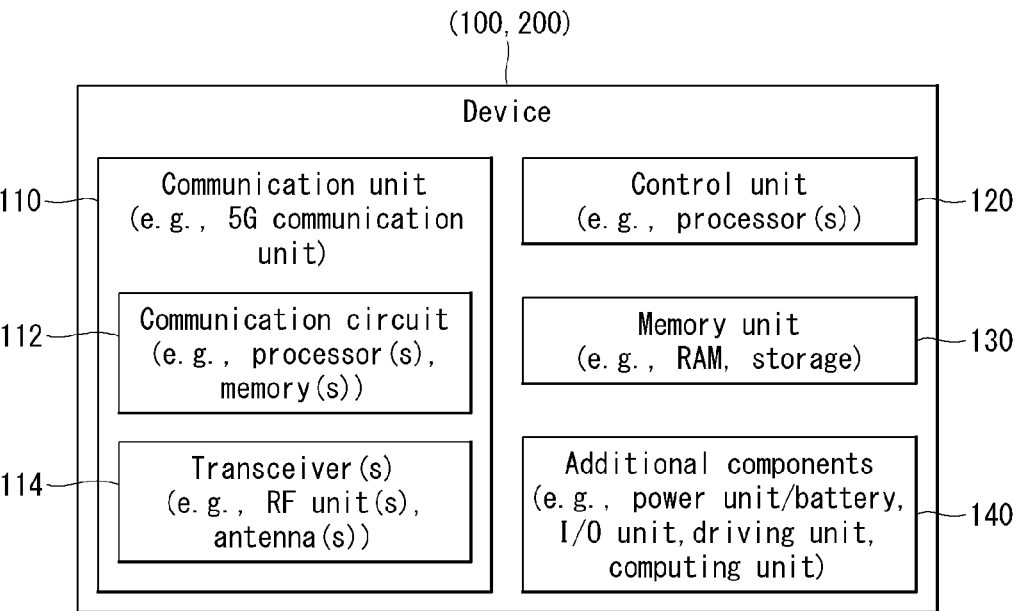

【FIG. 29】
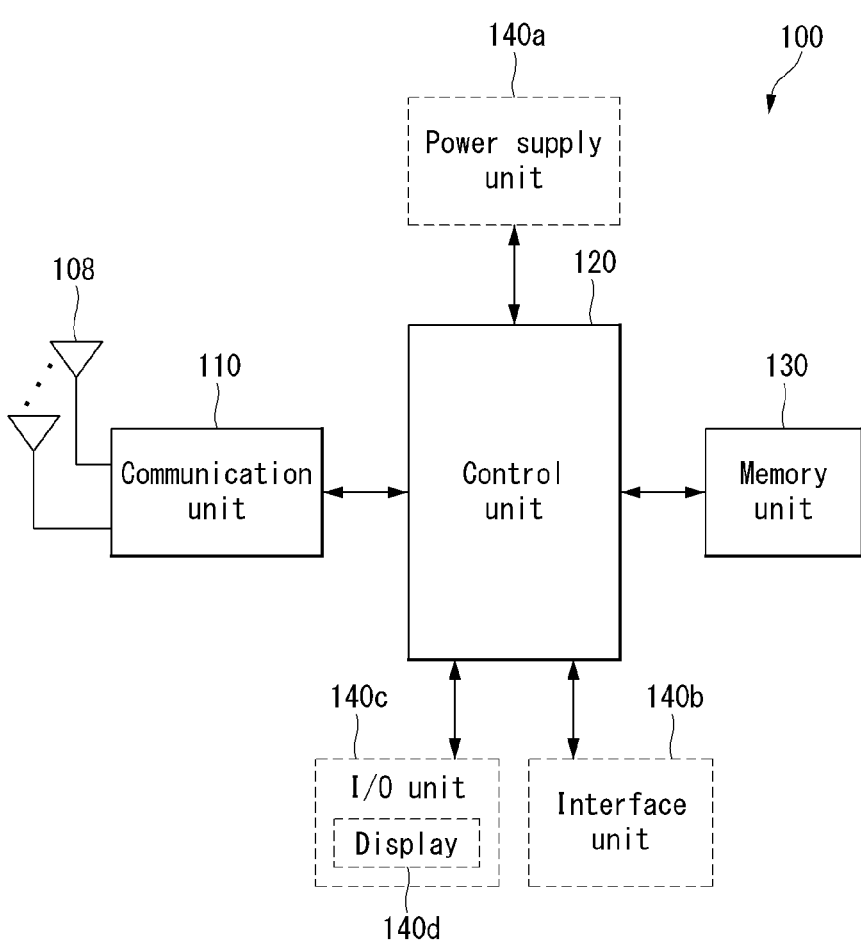

METHOD FOR REPORTING POWER HEADROOM IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2021/013925, filed on Oct. 8, 2021, which claims the benefit of KR Application No. 10-2020-0130082, filed on Oct. 8, 2020, the contents of which are all hereby incorporated by reference herein in their entirety.

TECHNICAL FIELD

The present disclosure relates to a method and device for reporting a power headroom in a wireless communication system.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

According to a related art, a P-MPR report related to maximum permissible exposure (MPE) is defined to be performed through an existing PHR report. However, an MPE issue may be dependent on a DL/UL RS for a transmit (Tx) beam indication or/and a Tx panel not being dependent on a specific channel/reference signal (RS).

Accordingly, in order to perform the power control to meet MPE requirements, panel dependency of the MPE issue needs to be considered.

The present disclosure proposes a method for meeting MPE requirements based on the above-described contents.

The technical objects of the present disclosure are not limited to the aforementioned technical objects, and other technical objects, which are not mentioned above, will be apparently appreciated by a person having ordinary skill in the art from the following description.

In one aspect of the present disclosure, there is provided a method of a user equipment (UE) to report a power headroom (PH) in a wireless communication system, the method comprising receiving configuration information related to the power headroom (PH), and transmitting a message for a report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

The message for the report of the PH may be based on a PHR MAC CE (Power Headroom Report Medium Access Control Control Element).

The one or more specific indexes may be related to at least one of i) a panel, ii) a reference signal (RS), or iii) a transmission configuration indicator (TCI) state.

The one or more specific indexes may be related to a panel ID.

The one or more specific indexes may be related to a resource of the RS.

The resource of the RS may be related to at least one of a channel state information-reference signal (CSI-RS) or a synchronization signal block (SSB).

The one or more specific indexes may be related to an uplink transmission configuration indicator (UL TCI) state.

The pre-configured event may occur based on a specific threshold related to maximum permissible exposure (MPE).

The specific threshold may be related to the PH or a UE maximum output power (Pcmax).

The one or more values related to the PH may be related to a power backoff for meeting MPE requirements.

In another aspect of the present disclosure, there is provided a user equipment (UE) reporting a power headroom (PH) in a wireless communication system, the UE comprising one or more transceivers, one or more processors configured to control the one or more transceivers, and one or more memories operably connected to the one or more processors.

The one or more memories store instructions, that are configured to allow the one or more processors to perform operations, based on being executed by the one or more processors.

The operations comprise receiving configuration information related to the power headroom (PH), and transmitting a message for a report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

In another aspect of the present disclosure, there is provided a device comprising one or more memories, and one or more processors functionally connected to the one or more memories.

The one or more memories store instructions, that are configured to allow the one or more processors to perform operations, based on being executed by the one or more processors.

The operations comprise receiving configuration information related to a power headroom (PH), and transmitting a message for a report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

In another aspect of the present disclosure, there is provided one or more non-transitory computer readable mediums storing one or more instructions.

The one or more instructions are configured, based on being executed by one or more processors, to allow the one or more processors to perform operations.

The operations comprise receiving configuration information related to a power headroom (PH), and transmitting a message for a report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

In another aspect of the present disclosure, there is provided a method of a base station to receive a report for a power headroom (PH) in a wireless communication system, the method comprising transmitting configuration information related to the power headroom (PH), and receiving a message for the report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

In another aspect of the present disclosure, there is provided a base station receiving an uplink signal in a wireless communication system, the base station comprising one or more transceivers, one or more processors configured to control the one or more transceivers, and one or more memories operably connected to the one or more processors.

The one or more memories store instructions, that are configured to allow the one or more processors to perform operations, based on being executed by the one or more processors.

The operations comprise transmitting configuration information related to a power headroom (PH), and receiving a message for a report of the PH.

The report of the PH is triggered based on a pre-configured event, and the message for the report of the PH includes information related to P-MPR (Power management-Maximum Power Reduction).

The information related to the P-MPR includes one or more values related to the PH, and the one or more values related to the PH are related to one or more specific indexes.

According to embodiments of the present disclosure, a report of power headroom based on an MPE related event is performed at a panel level or a level corresponding to a panel. Accordingly, effectiveness of power control performed to meet MPE requirements can be improved.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 illustrates an uplink transmission/reception operation to which a method described in the present disclosure is applicable.

FIG. 11 illustrates an example of a procedure of controlling uplink transmission power to which a method described in the present disclosure is applicable.

FIG. 12 illustrates a single entry PHR MAC CE to which a method described in the present disclosure is applicable.

FIGS. 13 and 14 illustrate multiple entry PHR MAC CEs to which a method described in the present disclosure is applicable.

FIG. 15 and FIG. 16 illustrate an example of multi-panel based on an RF switch applied to the disclosure.

FIG. 17 illustrates a PUCCH transmission procedure to which a method proposed in the present disclosure is applied.

FIG. 18 illustrates an SRS transmission procedure to which a method proposed in the present disclosure is applied.

FIG. 19 illustrates a PUSCH transmission procedure to which a method proposed in the present disclosure is applied.

FIG. 20 illustrates a PRACH transmission procedure to which a method proposed in the present disclosure is applied.

FIG. 21 illustrates a beam reporting procedure to which a method described in the present disclosure is applied.

FIG. 22 illustrates a scheduling request procedure to which a method described in the present disclosure is applied.

FIG. 23 is a flow chart illustrating a method for a UE to report a power headroom in a wireless communication system according to an embodiment of the present disclosure.

FIG. 24 is a flow chart illustrating a method for a base station to receive a report for power headroom in a wireless communication system according to another embodiment of the present disclosure.

FIG. 25 illustrates a communication system 1 applied to the present disclosure.

FIG. 26 illustrates wireless devices applicable to the present disclosure.

FIG. 27 illustrates a signal process circuit for a transmission signal.

FIG. 28 illustrates another example of a wireless device applied to the present disclosure.

FIG. 29 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, $\mu$). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| $\mu$ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f = (\Delta f_{max} N_f/100) \cdot T_s = 10$ ms. Here, the radio frame is constituted of 10 subframes each of which has a period of $T_{sf} = (\Delta f_{max} N_f/1000) \cdot T_s = 1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology $\mu$, slots are numbered in ascending order of $n_s^{\mu} \in \{0, \ldots, N_{subframe}^{slots, \mu} - 1\}$ in the subframe and in ascending order of $n_{s,f}^{\mu} \in \{0, \ldots, N_{frame}^{slots, \mu} - 1\}$ in the radio frame. One slot includes consecutive OFDM symbols of $N_{symb}^{\mu}$, and $N_{symb}^{\mu}$ is determined according to the used numerology and slot configuration. In the subframe, the start of slot $n_s^{\mu}$ is temporally aligned with the start of $n_s^{\mu} N_{symb\mu}$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CR Table 4 represents the number of OFDM symbols per slot, the number of slots per radio frame, and the number of slots per subframe in an extended CP.

9

TABLE 3

| $\mu$ | $N_{symb}{}^{slot}$ | $N_{slot}{}^{frame,\mu}$ | $N_{slot}{}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}{}^{slot}$ | $N_{slot}{}^{frame,\mu}$ | $N_{slot}{}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu$=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}{}^{\mu}N_{sc}{}^{RB}$ subcarriers on a frequency domain, each subframe consisting of 14·2$\mu$ OFDM symbols, but the present disclosure is not limited thereto.

In the NR system, a transmitted signal is described by one or more resource grids, consisting of $N_{RB}{}^{\mu}N_{sc}{}^{RB}$ subcarriers, and $2^{\mu}N_{symb}{}^{(\mu)}$ OFDM symbols, where $N_{RB}{}^{\mu}\leq N_{RB}{}^{max,\ \mu}$. $N_{RB}{}^{max,\ \mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,$\bar{l}$), where k=0, . . . , $N_{RB}{}^{\mu}N_{sc}{}^{RB}-1$ is an index on a frequency domain, and $\bar{l}$=0, . . . , $2^{\mu}N_{symb}{}^{(\mu)}-1$ refers to a location of a symbol in a

10 subframe. The index pair (k,$\bar{l}$) is used to refer to a resource element in a slot, where l=0, . . . , $N_{symb}{}^{\mu}-1$.

The resource element (k,$\bar{l}$) for the numerology $\mu$ and the antenna port p corresponds to a complex value $\sigma_{k,\bar{l}}{}^{(p,\mu)}$. When there is no risk for confusion or when a specific antenna port or numerology is not specified, the indexes p and $\mu$ may be dropped, and as a result, the complex value may be $a_{k,\bar{l}}{}^{(p)}$ or $a_{k,\bar{l}}$.

Further, a physical resource block is defined as $N_{sc}{}^{RB}$=12 consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $n_{CRB}{}^{\mu}$ in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,j}{}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \qquad \text{[Equation 2]}$$

Here, $N_{BWP,j}{}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

When there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=                SEQUENCE {
    tci-StateId                 TCI-StateId,
    qcl-Type1                   QCL-Info,
    qcl-Type2                   QCL-Info
    ...
}
QCL-Info ::=                 SEQUENCE {
    cell                        ServCellIndex
    bwp-Id                      BWP-Id
    referenceSignal             CHOICE {
        csi-rs                      NZP-CSI-RS-ResourceId,
        ssb                         SSB-Index
    },
    qcl-Type                    ENUMERATED {typeA, typeB, typeC, typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList            SEQUENCE (SIZE(1..maxNrofSRS-
ResourceSets)) OF SRS-ResourceSetId         OPTIONAL,    -- Need N
    srs-ResourceSetToAddModList             SEQUENCE (SIZE(1..maxNrofSRS-
```

TABLE 6-continued

```
ResourceSets)) OF SRS-ResourceSet                OPTIONAL,   -- Need N
    srs-ResourceToReleaseList             SEQUENCE (SIZE(1..maxNrofSRS-
Resources)) OF SRS-ResourceId                 OPTIONAL, -- Need N
    srs-ResourceToAddModList          SEQUENCE (SIZE(1..maxNrofSRS-
Resources)) OF SRS-Resource               OPTIONAL,   -- Need N
    tpc-Accumulation                     ENUMERATED {disabled}
    ...
}
SRS-ResourceSet ::=                      SEQUENCE {
    srs-ResourceSetId                        SRS-ResourceSetId,
    srs-ResourceIdList                       SEQUENCE (SIZE(1..maxNrofSRS-
ResourcesPerSet)) OF SRS-ResourceId          OPTIONAL, -- Cond Setup
    resourceType                         CHOICE {
        aperiodic                            SEQUENCE {
            aperiodicSRS-ResourceTrigger              INTEGER (1..maxNrofSRS-
TriggerStates-1),
            csi-RS                           NZP-CSI-RS-ResourceId
            slotOffset                       INTEGER (1..32)
            ...
        },
        semi-persistent                      SEQUENCE {
            associatedCSI-RS                 NZP-CSI-RS-ResourceId
            ...
        },
        periodic                         SEQUENCE {
            associatedCSI-RS                      NZP-CSI-RS-ResourceId
            ...
        }
    },
    usage                             ENUMERATED {beamManagement,
codebook, nonCodebook, antennaSwitching},
    alpha                                Alpha
    p0                                   INTEGER (-202..24)
    pathlossReferenceRS                  CHOICE {
        ssb-Index                            SSB-Index,
        csi-RS-Index                         NZP-CSI-RS-ResourceId
SRS-SpatialRelationInfo ::=           SEQUENCE {
    servingCellId                        ServCellIndex
    referenceSignal                      CHOICE {
        ssb-Index                            SSB-Index,
        csi-RS-Index                         NZP-CSI-RS-ResourceId,
        srs                                  SEQUENCE {
            resourceId                            SRS-ResourceId,
            uplinkBWP                        BWP-Id
        }
    }
}
SRS-ResourceTo ::=                    INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station.

For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 is a flowchart showing an example of an uplink transmission/reception operation to which a method proposed in the present disclosure may be applied.

Referring to FIG. 10, the eNB schedules uplink transmission such as the frequency/time resource, the transport layer, an uplink precoder, the MCS, etc., (S1010). In particular, the eNB may determine a beam for PUSCH transmission of the UE through the aforementioned operations.

The UE receives DCI for downlink scheduling (i.e., including scheduling information of the PUSCH) on the PDCCH (S1020).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1030).

When the UE detects a PDCCH including DCI format 0_0 or 0_1, the UE transmits the corresponding PUSCH according to the indication by the corresponding DCI.

FIG. 11 illustrates an example of a procedure of controlling uplink transmission power to which a method described in the present disclosure is applicable.

First, a user equipment (UE) may receive, from a base station, parameter and/or information related to transmission power (Tx power), in S1110. In this case, the UE may receive the parameter and/or information via higher layer signaling (e.g., RRC signaling, MAC-CE, etc.). For example, with regard to PUSCH transmission, PUCCH transmission, SRS transmission, and/or PRACH transmission, the UE may receive the parameters and/or information related to the transmission power control.

Next, the UE may receive, from the base station, a TPC command related to the transmission power, in S1120. In this case, the UE may receive the TPC command via lower layer signaling (e.g., DCI), etc. For example, with regard to PUSCH transmission, PUCCH transmission, and/or SRS transmission, the UE may receive information for the TPC command to be used to determine a power control adjustment state through a TPC command field of a predefined DCI format. However, for the PRACH transmission, the corresponding step may be omitted.

Next, the UE may determine (or calculate) a transmission power for uplink transmission based on the parameter, information, and/or TPC command received from the base station, in S1130. For example, the UE may determine PUSCH transmission power, PUCCH transmission power, SRS transmission power, and/or PRACH transmission power. For example, if two or more uplink channels and/or signals are required to be overlapped and transmitted as in a situation such as carrier aggregation, the UE may determine the transmission power for uplink transmission considering the priority, etc.

Next, the UE may perform transmission of one or more uplink channels and/or signals (e.g., PUSCH, PUCCH, SRS, PRACH, etc.) for the base station based on the determined (or calculated) transmission power, in S1140.

Power Headroom Report

A power headroom report is performed to provide, by a UE, the following information to a base station.

Type 1 power headroom: a difference between a nominal maximum transmission power (e.g., $P_{CMAX, f,c}(i)$ or configured UE transmission power or configured UE maximum output power) per activated serving cell and an estimated transmission power for UL-SCH/PUSCH per activated serving cell Type 2 power headroom: a difference between an estimated transmission power of PUCCH and UL-SCH/PUSCH transmitted on SpCell of other MAC entity (i.e., E-UTRA MAC entity in EN-DC) and a nominal maximum transmission power (e.g., $P_{CMAX, f,c}(i)$ or configured UE transmission power or configured UE maximum output power) in the SpCell Type 3 power headroom: a difference between a nominal maximum transmission power (e.g., $P_{CMAX, f,c}(i)$ or configured UE transmission power or configured UE maximum output power) per activated serving cell and an estimated transmission power of SRS per activated serving cell If two UL carriers are configured in a serving cell, and the Type 1 power headroom report and the Type 3 power headroom report are determined in the serving cell, if both the Type 1 power headroom report and the Type 3 power headroom report have been determined based on actual transmission or have been determined based on reference transmission, the UE may perform the Type 1 power headroom report, or if either the Type 1 power headroom report or the Type 3 power headroom report is determined based on the reference transmission, the UE may perform the power headroom report (e.g., Type 1 or Type 3) determined based on the actual transmission.

In the present disclosure, virtual PH may mean the Type 1 power headroom, the Type 2 power headroom and/or the Type 3 power headroom determined based on reference transmission.

1) Type 1 PH Report

If a UE performs the Type 1 power headroom of a serving cell activated based on actual PUSCH transmission (at PUSCH transmission occasion i in activated UL BWP b of carrier f of the serving cell c), the Type 1 power headroom (i.e., $PH_{type1b,f,c}(i,j,q_d,l)$) may be determined as in the following Equation 3.

$$PH_{type1,b,f,c}(i,j,q_d,l)=P_{CMAX,f,c}(i)-\{P_{O\_PUSCH,b,f,c}(i)+ \\ 10\log_{10}(2^\mu \cdot M_{RB,b,f,c}^{PUSCH}(i))+\alpha_{b,f,c}(j)\cdot PL_{b,f,c} \\ (q_d)+\Delta_{TF,b,f,c}(i)+f_{b,f,c}(i,l)\}$$

[Equation 3]

Here, $P_{CMAX,f,c}(i)$ may denote a configured UE transmission power. $P_{O\_PUSCH,b,f,c}(j)$ is a parameter broadcasted to a part of system information and may denote target received power at a receiving side. $M_{RB,b,f,c}^{PUSCH}(i)$ may denote a bandwidth of PUSCH resource allocation expressed as the number of resource blocks (RBs) for a PUSCH transmission occasion based on a subcarrier spacing. $\alpha_{b,f,c}(j)$ may denote a ratio of performing compensation for pathloss (PL). Index q_d denotes an index of a DL RS resource for pathloss (PL) measurement (e.g., $PL_{b,f,c}(q_d)$). $\Delta_{TF,b,f,c}(i)$ is pre-configured. Further, $f_{b,f,c}(i,l)$ related to a PUSCH power control adjustment state may be configured or indicated based on a TPC command field of DCI (e.g., DCI format 0_0, DCI format 0_1, DCI format 2_2, DCI format2_3, etc.).

If the UE performs the Type 1 power headroom of an activated serving cell based on reference PUSCH transmission (at PUSCH transmission occasion i in activated UL BWP b of carrier f of the serving cell c), the Type 1 power headroom (i.e., $PH_{type1,b,f,c}(i,j,q_d,l)$) may be determined as in the following Equation 4.

alpha), and pathloss (PL) measurement (e.g., $PL_{b,f,c}(q_d)$). $h_{b,f,c}(i)$ related to an SRS power control adjustment state may be configured or indicated based on a TPC command field of DCI (e.g., DCI format 2_3, etc.) received or detected by a UE and/or an RRC parameter (e.g., srs-PowerControlAdjustmentStates, etc.).

If the UE performs the Type 3 power headroom of a serving cell activated based on reference SRS transmission (at SRS transmission occasion i in activated UL BWP b of carrier f of the serving cell c), the Type 3 power headroom (i.e., $PH_{type3b,f,c}(i,q_s)$) may be determined as in the following Equation 6.

$$PH_{type3b,f,c}(i,q_s)=\tilde{P}_{CMAX,f,c}(i)-\{P_{O\_SRSb,f,c}(q_s)+ \\ \alpha_{SRS,b,f,c}(q_s)\cdot PL_{b,f,c}(q_d)+h_{b,f,c}(i)\}\;[dB]$$

[Equation 6]

In Equation 6, $q_s$ is an SRS resource set corresponding to SRS-ResourceSetId=0 for UL BWP b.

3) Power Headroom Reporting Related Procedure

In order to perform power headroom reporting, PHR-Config that a base station configures to a UE may be configured as in the following Table 7.

TABLE 7

| - PHR-Config |
| The IE PHR-Config is used to configure parameters for power headroom reporting. |

<table>
<tr><td colspan="2">PHR-Config information element</td></tr>
<tr><td>-- ASN1START</td><td></td></tr>
<tr><td>-- TAG-PHR-CONFIG-START</td><td></td></tr>
<tr><td>PHR-Config ::=</td><td>SEQUENCE {</td></tr>
<tr><td>phr-PeriodicTimer</td><td>ENUMERATED {sf10, sf20, sf50, sf100, sf200,sf500, sf1000, infin</td></tr>
<tr><td>ity},</td><td></td></tr>
<tr><td>phr-ProhibitTimer</td><td>ENUMERATED {sf0, sf10, sf20, sf50, sf100,sf200, sf500, sf1000},</td></tr>
<tr><td>phr-Tx-PowerFactorChange</td><td>ENUMERATED {dB1, dB3, dB6, infinity},</td></tr>
<tr><td>multiplePHR</td><td>BOOLEAN,</td></tr>
<tr><td>dummy</td><td>BOOLEAN,</td></tr>
<tr><td>phr-Type2OtherCell</td><td>BOOLEAN,</td></tr>
<tr><td>phr-ModeOtherCG</td><td>ENUMERATED {real, virtual},</td></tr>
<tr><td>...</td><td></td></tr>
<tr><td>}</td><td></td></tr>
<tr><td>-- TAG-PHR-CONFIG-STOP</td><td></td></tr>
<tr><td>-- ASN1STOP</td><td></td></tr>
</table>

$$PH_{type1b,f,c}(i,j,q_d,l)=\tilde{P}_{CMAX,f,c}(i)-\{P_{O\_PUSCH,b,f,c}(j)+ \\ \alpha_{b,f,c}(j)\cdot PL_{b,f,c}(q_d)+f_{b,f,c}(i,l)\}\;[dB]$$

[Equation 4]

In Equation 4, $\tilde{P}_{CMAX,f,c}(i)$ is calculated assuming that MPR=0 dB, A-MPR=0 dB, P-MPR=0 dB, and ΔTC=0 dB. A-MPR, P-MPR and ΔTC are defined in the predefined standard (38.101-1, 38.101-2, 38.101-3).

2) Type 3 PH Report

If the UE performs the Type 3 power headroom of a serving cell activated based on actual SRS transmission (at SRS transmission occasion i in activated UL BWP b of carrier f of the serving cell c), the Type 1 power headroom (i.e., $PH_{type3b,f,c}(i,q_s)$) may be determined as in the following Equation 5.

$$PH_{type3,b,f,c}(i,q_s)=P_{CMAX,f,c}(i)-\{P_{O\_SRS,b,f,c}(q_s)+10 \\ \log_{10}(2^\mu \cdot M_{SRS,b,f,c}(i))+\alpha_{SRS,b,f,c}(q_s)\cdot PL_{b,f,c}(q_d)+ \\ h_{b,f,c}(i)\}$$

[Equation 5]

$P_{O\_SRS,b,f,c}(q_s)$ is a parameter broadcasted to apart of system information and may denote target received power at a receiving side. $M_{SRS,b,f,c}(i)$ may denote a bandwidth of SRS resource allocation expressed as the number of resource blocks (RBs) for an SRS transmission occasion based on a subcarrier spacing. $\alpha_{SRS,b,f,c}(q_s)$ may denote a ratio of performing compensation for pathloss. Index q_s denotes an index for an open-loop power control parameter (e.g., Po, In Table 7, dummy is not used, and the UE may ignore the received value.

multiplePHR indicates whether power headroom shall be reported using the Single Entry PHR MAC control element or using Multiple Entry PHR MAC control element defined in thepredefined standard (e.g., TS 38.321). True means to use Multiple Entry PHR MAC control element, and False means to use the Single Entry PHR MAC control element. The base station (or network) may configure this field to true for MR-DC and UL CA for NR, and to false in all other cases.

phr-ModeOtherCG indicates the mode used for the PHR of the activated cells that are part of the other Cell Group (i.e., MCG or SCG), when DC is configured. If the UE is configured with only one cell group, it ignores the field.

phr-PeriodicTimer represents value in number of subframes for PHR reporting. Value sf10 corresponds to 10 subframes, value sf20 corresponds to 20 subframes, and so on.

phr-ProhibitTimer represents value in number of subframes for PHR reporting. Value sf0 corresponds to 0 subframe, value sf10 corresponds to 10 subframes, value sf20 corresponds to 20 subframes, and so on.

phr-Tx-PowerFactorChange is value in dB for PHR reporting. Value dB1 corresponds to 1 dB, dB3 corresponds to 3 dB, and so on. The same value applies for each serving cell.

If phr-Type2OtherCell is set to true, the UE shall report a PHR type 2 for the SpCell of the other MAC entity. The base station (or network) sets this field to false if the UE is not configured with an E-UTRA MAC entity.

A power headroom report (PHR) may be triggered if any of the following events occur.

phr-ProhibitTimer expires or has expired and the path loss has changed more than phr-Tx-PowerFactorChange dB for at least one activated serving cell of MAC entity which is used as a pathloss reference since the last transmission of a PHR in this MAC entity;

phr-PeriodicTimer expires;

upon configuration or reconfiguration of the power headroom reporting functionality by upper layers;

activation of an SCell of any MAC entity with configured uplink;

addition of the PSCell (i.e., PSCell is newly added or changed);

phr-ProhibitTimer expires or has expired, when the MAC entity has UL resources for new transmission, and the following is true for any of the activated serving cells of any MAC entity with configured uplink: there are UL resources allocated for transmission or there is a PUCCH transmission on this cell, and the required power backoff due to power management for this cell has changed more than phr-Tx-PowerFactorChange dB since the last transmission of a PHR when the MAC entity had UL resources allocated for transmission or PUCCH transmission on this cell.

If UL transmission resources for new transmission are allocated to MAC entity of the UE, the UE includes power headroom corresponding to Type 1 PHR, Type 2 PHR and/or Type 3 PHR and/or $P_{CMAX}$ in MAC-CE as represented in Table 7 and may transmit it to the base station. Detailed conditions and steps related to this may be the followings.

If the MAC entity has UL resources allocated for a new transmission, the MAC entity shall the following operation.

If it is the first UL resource allocated for a new transmission since the last MAC reset, the MAC entity starts phr-PeriodicTimer.

If the power headroom reporting procedure determines that at least one PHR has been triggered and not cancelled; and if the allocated UL resources can accommodate the MAC CE for PHR which the MAC entity is configured to transmit, plus its subheader, as a result of LCP:

if multiplePHR with value true is configured, for each activated serving cell with configured uplink associated with any MAC entity, the MAC entity obtains the value of the Type 1 or Type 3 power headroom for the corresponding uplink carrier. If this MAC entity has UL resources allocated for transmission on this serving cell, or if the other MAC entity, if configured, has UL resources allocated for transmission on this serving cell and phr-ModeOtherCG is set to real by upper layers, the MAC entity obtains the value for the corresponding PCMAX,f,c field from the physical layer.

If phr-Type2OtherCell with value true is configured, and if the other MAC entity is E-UTRA MAC entity, the MAC entity obtains the value of the Type 2 power headroom for the SpCell of the other MAC entity (i.e., E-UTRA MAC entity), and if phr-ModeOtherCG is set to real by upper layers, the MAC entity obtains the value for the corresponding PCMAX,f,c field for the SpCell of the other MAC entity (i.e., E-UTRA MAC entity) from the physical layer.

The MAC entity instructs the Multiplexing and Assembly procedure to generate and transmit the Multiple Entry PHR MAC CE defined based on the values reported by the physical layer.

If else (i.e., Single Entry PHR format is used), the MAC entity obtains the value of the Type 1 power headroom from the physical layer for the corresponding uplink carrier of the PCell, obtains the value for the corresponding PCMAX,f,c field from the physical layer, and instructs the Multiplexing and Assembly procedure to generate and transmit the Single Entry PHR MAC CE based on the values reported by the physical layer.

The MAC entity starts or restarts phr-PeriodicTimer.

The MAC entity starts or restarts phr-ProhibitTimer.

The MAC entity cancels all triggered PHR(s).

As described above, the UE may send, to the MAC layer, value(s) (e.g., power headroom(s) and/or PCMAX(s)) for the Type 1/2/3 power headroom report at the physical layer of the UE using information preconfigured from the base station, and the MAC layer, as in Table 7 and the above description, may send and/or report, to the base station, value(s) (e.g., power headroom(s) and/or PCMAX(s)) received (i.e., sent) from the physical layer via MAC-CE (e.g., Single Entry PHR MAC CE or Multiple Entry PHR MAC CE). For example, the MAC CE for the corresponding power headroom report may be transmitted and/or reported to the base station through the step S1140 of FIG. 11 described above, or transmitted and/or reported to the base station via subsequently transmitted uplink transmission.

The Single Entry PHR MAC CE and the Multiple Entry PHR MAC CE described above may be configured as follows.

If PHR related value(s) (e.g., all PHR related value(s) including modification of the corresponding values in addition to PH, virtual PH, and/or PCMAX) mentioned below in the present disclosure are transmitted/sent/reported (via MAC CE), the corresponding values may be interpreted to be leveled to N bit (i.e., N=6) as follows and to be transmitted/sent/reported. That is, a PHR related MAC-CE procedure described in the present disclosure may be interpreted to be performed with reference to the content described below.

Single Entry PHR MAC CE

The Single Entry PHR MAC CE is identified by a MAC subheader with LCID. The Single Entry PHR MAC CE has a fixed size and consists of two octets defined as follows (see FIG. 12).

R: Reserved bit, set to 0;

Power Headroom (PH): This field indicates the power headroom level. The length of the field is 6 bits. The reported PH and the corresponding power headroom levels are the same as Table 8 below. The corresponding measured values in dB may be defined in the predefined standard (e.g., TS 38.133).

PCMAX,f,c: This field indicates the PCMAX,f,c used for calculation of the preceding PH field. The PCMAX,f,c and the corresponding nominal UE transmit power levels are the same as Table 9. The corresponding measured values in dBm may be defined in the predefined standard (e.g., TS 38.133). Table 8 represents the power headroom level for PHR, and Table 9 represents the nominal UE transmit power level for PHR.

TABLE 8

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

TABLE 9

| $P_{CMAX,f,c}$ | Nominal UE transmit power level |
|---|---|
| 0 | PCMAX_C_00 |
| 1 | PCMAX_C_01 |
| 2 | PCMAX_C_02 |
| . . . | . . . |
| 61 | PCMAX_C_61 |
| 62 | PCMAX_C_62 |
| 63 | PCMAX_C_63 |

Multiple Entry PHR MAC CE

The Multiple Entry PHR MAC CE is identified by a MAC subheader with LCID. The Multiple Entry PHR MAC CE has a variable size, and includes the bitmap, a Type 2 PH field and an octet containing the associated PCMAX,f,c field (if reported) for SpCell of the other MAC entity, and a Type 1 PH field and an octet containing the associated PCMAX, f,c field (if reported) for the PCell.

It further includes, in ascending order based on the ServCellIndex, one or multiple of Type X PH fields and octets containing the associated PCMAX,f,c fields (if reported) for serving cells other than PCell indicated in the bitmap. X is either 1 or 3.

The presence of Type 2 PH field for SpCell of the other MAC entity is configured by phr-Type2OtherCell with value true.

A single octet bitmap is used for indicating the presence of PH per serving cell when the highest ServCellIndex of serving cell with configured uplink is less than 8. Otherwise, four octets are used.

The MAC entity determines whether PH value for an activated serving cell is based on real transmission or a reference format by considering the configured grant(s) and downlink control information which has been received until and including the PDCCH occasion for the first UL grant. A new transmission is received since a PHR has been triggered if the PHR MAC CE is reported on an uplink grant received on the PDCCH or until the first uplink symbol of PUSCH transmission minus PUSCH preparation time.

For a band combination in which the UE does not support dynamic power sharing, the UE may omit the octets containing Power Headroom field and PCMAX,f,c field for serving cells in the other MAC entity except for the PCell in the other MAC entity. The reported values of Power Headroom and PCMAX,f,c for the PCell are up to UE implementation.

The PHR MAC CE may be configured as illustrated in FIG. 13 or 17.

Ci: This field indicates the presence of a PH field for the serving cell with ServCellIndex i. The Ci field set to 1 indicates that a PH field for the serving cell with ServCellIndex i is reported. The Ci field set to 0 indicates that a PH field for the serving cell with ServCellIndex i is not reported.

R: Reserved bit, set to 0;

V: This field indicates if the PH value is based on a real transmission or a reference format. For Type 1 PH, the V field set to 0 indicates real transmission on PUSCH, and the V field set to 1 indicates that a PUSCH reference format is used. For Type 2 PH, the V field set to 0 indicates real transmission on PUCCH, and the V field set to 1 indicates that a PUCCH reference format is used. For Type 3 PH, the V field set to 0 indicates real transmission on SRS, and the V field set to 1 indicates that an SRS reference format is used. Furthermore, for Type 1, Type 2, and Type 3 PH, the V field set to 0 indicates the presence of the octet containing the associated PCMAX,f,c field, and the V field set to 1 indicates that the octet containing the associated PCMAX,f,c field is omitted.

Power Headroom (PH): This field indicates the power headroom level. The length of the field is 6 bits. The reported PH and the corresponding power headroom levels are shown in Table 8.

P: This field indicates whether the MAC entity applies power backoff due to power management. The MAC entity shall set the P field to 1 if the corresponding PCMAX,f,c field would have had a different value if no power backoff due to power management had been applied.

PCMAX,f,c: If present, this field indicates the PCMAX, f,c for the NR serving cell and the PCMAX,c or P̃CMAX,c. For the E-UTRA serving cell used for calculation of the preceding PH field, the reported PCMAX,f,c and the corresponding nominal UE transmit power levels are shown in Table 9.

FIGS. 13 and 14 illustrate multiple entry PHR MAC CEs to which a method described in the present disclosure is applicable.

Specifically, FIG. 13 illustrates multiple entry PHR MAC CE in which highest ServCellIndex of serving cell with configured uplink is less than 8. FIG. 14 illustrates multiple entry PHR MAC CE in which highest ServCellIndex of serving cell with configured uplink is equal to or greater than 8.

Hereinafter, matters related to the definition of a panel in the present disclosure will be described in detail.

A "panel" referred to in the present disclosure may be based on at least one of the following definitions.

According to an embodiment, the "panel" may be interpreted/applied by being transformed into "one panel or a plurality of panels" or a "panel group". The panel may be related to a specific characteristic (e.g., a timing advance (TA), a power control parameter, etc.). The plurality of panels may be panels having a similarity/common value in terms of the specific characteristic.

According to an embodiment, a "panel" may be interpreted/applied by being transformed into "one antenna port or a plurality of antenna ports", "one uplink resource or a plurality of uplink resources", an "antenna port group" or an "uplink resource group (or set)". The antenna port or the uplink resource may be related to a specific characteristic (e.g., a timing advance (TA), a power control parameter, etc.). The plurality of antenna ports (uplink resources) may be antenna ports (uplink resources) having a similarity/common value in terms of the specific characteristic.

According to an embodiment, a "panel" may be interpreted/applied by being transformed into "one beam or a plurality of beams" or "at least one beam group (or set)".

The beam (beam group) may be related to a specific characteristic (e.g., a timing advance (TA), a power control parameter, etc.). The plurality of beams (beam groups) may be beams (beam groups) having a similarity/common value in terms of the specific characteristic.

According to an embodiment, a "panel" may be defined as a unit for a UE to configure a transmission/reception beam. For example, a "transmission panel (Tx panel)" may be defined as a unit in which a plurality of candidate transmission beams can be generated by one panel, but only one of the beams can be used for transmission at a specific time (that is, only one transmission beam (spatial relation information RS) can be used per Tx panel in order to transmit a specific uplink signal/channel).

According to an embodiment, a "panel" may refer to "a plurality antenna ports (or at least one antenna port)", a "antenna port group" or an "uplink resource group (or set)" with common/similar uplink synchronization. Here, the "panel" may be interpreted/applied by being transformed into a generalized expression of "uplink synchronization unit (USU)". Alternatively, the "panel" may be interpreted/applied by being transformed into a generalized expression of "uplink transmission entity (UTE)".

Additionally, the "uplink resource (or resource group)" may be interpreted/applied by being transformed into a resource (or a resource group (set)) of a physical uplink shared channel (PUSCH)/physical uplink control channel (PUCCH)/sounding reference signal (SRS)/physical random access channel (PRACH). Conversely, a resource (resource group) of a PUSCH/PUCCH/SRS/PRACH may be interpreted/applied as an "uplink resource (or resource group)" based on the definition of the panel.

In the present disclosure, an "antenna (or antenna port)" may represent a physical or logical antenna (or antenna port).

As described above, a "panel" referred to in the present disclosure can be interpreted in various ways as "a group of UE antenna elements", "a group of UE antenna ports", "a group of logical antennas", and the like. Which physical/logical antennas or antenna ports are mapped to one panel may be variously changed according to position/distance/correlation between antennas, an RF configuration and/or an antenna (port) virtualization method. The phaming process may vary according to a UE implementation method.

In addition, the "panel" referred to in the present disclosure may be interpreted/applied by being transformed into "a plurality of panels" or a "panel group" (having similarity in terms of specific characteristics).

Hereinafter, matters related to implementation of a multi-panel will be described.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 15 and 16.

FIG. 15 and FIG. 16 illustrate an example of multi-panel based on an RF switch applied to the disclosure.

A plurality of panels may be implemented based on an RF switch.

Referring to FIG. 15, only one panel may be activated at a time, and signal transmission may be impossible for a predetermined time during which the activated panel is changed (i.e., panel switching).

FIG. 16 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 16, the concept described above in connection with the SRS resource set may be directly applied to the SRS resource group. When considering panel switching according to the panel implementation scheme according to FIG. 15, an SRS resource group may be defined separately from the SRS resource set.

For example, a specific ID may be assigned to each SRS resource such that resources having the same ID belong to the same SRS resource group (SRS resource group) and resources having different IDs belong to different resource groups.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 10 may be possible.

TABLE 10

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 10, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

With respect to multi-panel transmission, UE category information may be defined in order for a UE to report performance information thereof related to multi-panel transmission. As an example, three multi-panel UE (MPUE) categories may be defined, and the MPUE categories may be classified according to whether a plurality of panels can be activated and/or whether transmission using a plurality of panels is possible.

In the case of the first MPUE category (MPUE category 1), in a UE in which multiple panels are implemented, only one panel may be activated at a time, and a delay for panel switching and/or activation may be set to [X]ms. For example, the delay may be set to be longer than a delay for beam switching/activation and may be set in units of symbols or slots.

In the case of the second MPUE category (MPUE category 2), in a UE in which multiple panels are implemented, multiple panels may be activated at a time, and one or more panels may be used for transmission. That is, simultaneous transmission using panels may be possible in the second MPUE category.

In the case of the third MPUE category (MPUE category 3), in a UE in which multiple panels are implemented, multiple panels may be activated at a time, but only one panel may be used for transmission.

With respect to multi-panel-based signal and/or channel transmission/reception proposed in the present disclosure, at least one of the three MPUE categories described above may be supported. For example, in Rel-16, MPUE category 3 among the following three MPUE categories may be (optionally) supported.

In addition, information on an MPUE category may be predefined on the standards or semi-statically configured according to a situation in a system (i.e., a network side or a UE side) and/or dynamically indicated. In this case, configuration/indication related to multi-panel-based signal and/or channel transmission/reception may be performed in consideration of the MPUE category.

Hereinafter, matters related to configuration/indication related to panel-specific transmission/reception will be described.

With respect to a multi-panel-based operation, transmission and reception of signals and/or channels may be panel-specifically performed. Here, "panel-specific" may mean that transmission and reception of signals and/or channels in units of panels can be performed. Panel-specific transmission/reception may also be referred to as panel-selective transmission/reception.

With respect to panel-specific transmission and reception in the multi-panel-based operation proposed in the present disclosure, a method of using identification information (e.g., an identifier (ID), an indicator, etc.) for setting and/or indicating a panel to be used for transmission and reception among one or more panels may be considered.

As an example, an ID for a panel may be used for panel selective transmission of a PUSCH, a PUCCH, an SRS, and/or a PRACH among a plurality of activated panels. The ID may be set/defined based on at least one of the following four methods (Alts 1, 2, 3, and 4).

Alt.1: ID for a panel may be an SRS resource set ID.

As an example, when the aspects according to a) to c) below are considered, it may be desirable that each UE Tx panel correspond to an SRS support set that is set in terms of UE implementation.
   a) SRS resources of multiple SRS resource sets having the same time domain operation are simultaneously transmitted in the same bandwidth part (BWP).
   b) Power control parameters are set in units of SRS resource sets.
   c) A UE reports a maximum of 4 SRS resource sets (which may correspond to up to 4 panels) according to A supported time domain operation.

In the case of Alt.1 method, an SRS resource set related to each panel may be used for "codebook" and "non-codebook" based PUSCH transmission. In addition, a plurality of SRS resources belonging to a plurality of SRS resource sets may be selected by extending an SRI field of DCI. A mapping table between a sounding reference signal resource indicator (SRI) and an SRS resource may need to be extended to include the SRS resource in all SRS resource sets.

Alt.2: ID for a panel may be an ID (directly) associated with a reference RS resource and/or a reference RS resource set.

Alt.3: ID for a panel may be an ID directly associated with a target RS resource (reference RS resource) and/or a reference RS resource set.

In the case of Alt.3 method, configured SRS resource set(s) corresponding to one UE Tx panel can be controlled more easily, and the same panel identifier can be allocated to a plurality of SRS resource sets having different time domain operations.

Alt.4: ID for a panel may be an ID additionally set in spatial relation info (e.g., RRC parameter (SpatialRelation-Info)).

The Alt.4 method may be a method of newly adding information for indicating an ID for a panel. In this case, configured SRS resource set(s) corresponding to one UE Tx panel can be controlled more easily, and the same panel identifier can be allocated to a plurality of SRS resource sets having different time domain operations.

As an example, a method of introducing a UL TCI similarly to the existing DL TCI (Transmission Configuration Indication) may be considered. Specifically, UL TCI state definition may include a list of reference RS resources (e.g., SRS, CSI-RS and/or SSB). The current SRI field may be reused to select a UL TCI state from a configured set. Alternatively, a new DCI field (e.g., UL-TCI field) of DCI format 0_1 may be defined for the purpose of indicating the UL TCI state.

Information (e.g., panel ID, etc.) related to the above-described panel-specific transmission and reception can be transmitted through higher layer signaling (e.g., RRC message, MAC-CE, etc.) and/or lower layer signaling (e.g., L1 signaling, DCI, etc.). The information may be transmitted from a base station to a UE or from the UE to the base station according to circumstances or as necessary.

Further, the corresponding information may be set in a hierarchical manner in which a set for a candidate group is set and specific information is indicated.

Further, the above-described panel-related identification information may be set in units of a single panel or in units of multiple panels (e.g., a panel group or a panel set).

The contents (the 3GPP system, the frame structure, the NR system, etc.) described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

In Rel-15 NR, spatialRelationInfo is utilized in order to indicate a transmit beam which the BS is to utilize when transmitting a UL channel to the UE. Specifically, the BS may configure a DL reference signal (e.g., SSB-RI, CRI(P/SP/AP)) or an SRS (i.e., SRS resource) as a reference RS for a target UL channel or A target RS through an RRC configuration. Through such a configuration, the BS may indicate which UL transmit beam is to be utilized when transmitting the PUCCH/SRS.

The transmit beam of the SRS transmitted through the indication is indicated as a transmit beam for the PUSCH through the SRI field and used as the PUSCH transmit beam of the UE when the BS schedules the PUSCH to the UE. In the present disclosure, a background for a UL-TCI framework considered as a form expanding a framework called the spatialRelationInfo will be described. In the present disclosure, a method for indicating the transmit beam for the uplink channel of the UE by utilizing an uplink transmission configuration indicator (UL-TCI) and a transmit beam determination behavior of the UE which is subsequent according to the method will be described.

In Rel-15 NR, a beam for the PUSCH transmission of the UE may be indicated through the configuration of the SRI field of UL DCI as in the description of the beam management. A case where a beam correspondence will not be established and a case where the beam correspondence will be established for the corresponding procedure may be separately described.

In the case where the beam correspondence will not be established, the following procedure is performed.

1) A UL beam management behavior for finding a best UL analog beam is performed by utilizing multiple resources of an SRS resource set in which a usage is 'BM'.

2) A resource(s) determined as the best UL analog beam is linked to spatial relation information (e.g., SRS-SpatialRelationInfo) of resources which belong to an SRS resource set in which the usage is 'codebook (CB)' or 'non-codebook (non-CB)' as a result of UL BM. The UE may transmit the SRS in which the usage is 'CB' or 'non-CB' by the corresponding analog beam, and expect to being indicated with link adaptation and modulation and coding scheme (MCS)/rank indicator (RI)/transmission precoding matrix indicator (TPMI).

3) Finally, a candidate for a PUSCH beam indication may be configured based on the SRI field. Specifically, the candidate may be configured as the resources which belong to the SRS resource set which is 'CB' or 'non-CB' through the RRC based on one or two SRS resource indicators (SRIs).

As described above, the PUSCH beam indication may be performed based on the indication of the SRI field of the UL DCI for scheduling the PUSCH. In order for the resources which belong to the SRS resource set which is the 'CB' or 'non-CB' configured in the SRI field to be available for the PUSCH bema indication, the resources which belong to the SRS resource set which is the 'CB' or 'non-CB' should be transmitted through the SRS at least once before the UL DCI including the SRI indication.

When the bean correspondence is established, a UL BM behavior is omitted. A DL RS ID (CSI-RSI/SSB-RI) is configured in spatial relation information (e.g., SRS-SpatialRelationInfo) of the resource(s) of the SRS resource set in which the usage is 'CB' or 'non-CB' to configure a UL analog beam corresponding to the DL beam through the SRI field. Even in this case, the resources which belong to the SRS resource set which is the 'CB' or 'non-CB' should be transmitted through the SRS at least once before the UL DCI including the SRI indication.

As described above, the TCI state is utilized for the BS to configure/indicate, to the UE, a receive beam (i.e., spatial Rx parameter) to be utilized when receiving the PDCCH and the PDSCH by utilizing a Quasi co-located (QCL) concept introduced in (Rel-15) NR. A downlink reference signal (e.g., SSB-RI, CRI (P/SP/AP)) may be configured as a reference RS or a source RS of a QCL Type-D component through the corresponding TCI state. The BS may indicate, to the UE, utilizing the receive beam upon receiving the DL RS configured as the reference when receiving the PDCCH or PDSCH.

An agreement related to an Uplink Transmission Configuration Indicator (UL-TCI) will be described.

The BS may configure/indicate panel-specific transmission for UL transmission for uplink transmission through next Alt.2 or Alt.3.

Alt.2: A UL-TCI framework is introduced and a UL-TCI based signaling similar to a DL beam indication supported in Rel-15 is supported.

A new panel ID may or may not be introduced.

A panel specific signaling is performed using a UL-TCI state.

> Alt.3: A new panel-ID is introduced. The corresponding panel-ID may be implicitly/explicitly applied to transmission for a target RS resource/resource set, a PUCCH resource, an SRS resource, or a PRACH resource.

The panel-specific signaling is implicitly (e.g., by DL beam reporting enhancement) or explicitly performed by the new panel-ID.

When the signaling is explicitly performed, the panel-ID may be configured in a target RS/channel or reference RS (e.g., DL RS resource configuration or spatial relation info).

A new MAC CE may not be designated for the panel-ID.

Table 11 below shows the UL-TCI state based on the Alt.2.

Hereinafter, in the present disclosure, the transmit panel/beam to be utilized when transmitting the PUCCH/PUSCH may be construed/applied as the transmit panel/beam to be utilized when transmitting the DMRS of the PUCCH/PUSCH. Further, in the present disclosure, applying the transmit beam when transmitting PUCCH/PUSCH/PRACH/SRS, etc., may mean applying a spatial Tx parameter/spatial domain Tx filter/spatial Tx filter for the transmission of the PUCCH/PUSCH/PRACH/SRS.

[Proposal 1]

[Proposal 1-1]

The BS may indicate the transmit beams for the uplink channels of the UE based on the UL-TCI framework. Specifically, the panel ID may exist as an information element (IE) of a UL-TCI state configuration. That is, the BS

TABLE 11

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

The UL-TCI is considered as an integrated framework for indicating the transmit panel/beam in the UL channel of the UE by the BS as in the agreement. This is a form in which a DL-TCI in existing Rel-15 NR is extended to UL.

A DL RS (e.g., SSB-RI, CRI) or a UL RS (e.g., SRS) is configured as a reference RS or a source RS to be utilized/applied as a transmit beam for a target UL channel (e.g., PUCCH, PUSCH, PRACH) or a target UL RS (e.g., SRS) through a UL-TCI configuration (e.g. RRC signaling). The UE may utilize a corresponding reference transmit beam upon transmitting the corresponding target channel/RS.

The UL-TCI framework has the same purpose as a framework structure such as spatialRelationInfo of the existing Rel-15. However, the UL-TCI framework has an advantage of being capable of reducing the overhead and the delay as compared with the existing scheme when indicating the PUSCH beam. The reason is that the SRS for the purpose of the 'CB' or 'non-CB' should be particularly transmitted before indicating the SRI indication for transmission of the PUSCH in the case of the existing scheme. Further, the UL-TCI framework is meaningful even in constructing an integrated transmit beam indicating method for all UL channels such as PUCCH/PUSCH/SRS.

Hereinafter, 'a method for the BS to indicate the transmit panel/beam of the UE and a subsequent transmit panel/beam determining behavior of the UE' proposed in the present disclosure will be described. In other words, hereinafter, based on a background in which the UL-TCI framework considered as the form that extends the framework such as spatialRelationInfo is described above, a method for indicating the transmit panel/beam for the UL channel/RS of the UE by the BS by utilizing the UL-TCI will be described, and the subsequent transmit panel/beam determining behavior of the UE will be described (hereinafter, Proposals 1, 2, 3, and 4).

may indicate the transmit beam to be utilized in the target UL channel through the reference RS of the UL-TCI and indicate through which panel the corresponding target UL channel is to be transmitted. The reference RS of the UL-TCI may be configured as the DL RS (e.g., SSB-RI, CRI) or the UL RS (e.g., SRS).

A UL-TCI state configuration to which the panel ID is added may be expressed as in Table 12 below. In Table 12, a potential target UL channel of a fourth column may be a virtual target channel, and the target UL channel may not exist as the information element (IE) in each UL-TCI state configuration. That is, as transmit beam information for the target channel upon configuration/indication/scheduling of the target UL channel, one or multiple UL-TCI states may be linked/connected/configured in a UL-TCI state pool.

With respect to the PUCCH as an example, when the BS configures the PUCCH resource through the RRC, a specific UL-TCI state index may be configured (i.e., a UL-TCI state having a specific index may be configured) as transmit beam information for each PUCCH resource. Further, in the case of the SRS resource, a specific UL-TCI state index may be configured as the transmit beam information similarly to the PUCCH resource. With respect to the PUSCH, the transmit beam information may be configured as in Proposal 3 to be described below.

Hereinafter, a transmission configuration based on the embodiment will be described with a specific example.

As an example, in NR, a configuration for the PUCCH transmit beam is performed through an information element (IE) such as PUCCH-spatialRelationInfo for the PUCCH resource. As in the scheme, with respect to information on the UL-TCI, a transmission configuration of each PUCCH resource may be performed in a form in which a separate IE such as PUCCH-transmissionConfigurationIndicator exists for each PUCCH resource and configures a valid UL-TCI state index in the corresponding IE.

As another example, a field which may configure the UL-TCI state index may exist inside the existing PUCCH-spatialRelationInfo. Further, as the transmit beam configuration of the SRS is performed through the IE such as spatialRelationInfo even in the SRS resource in Rel-15 NR, the transmission configuration of each SRS resource may be performed in a form of configuring the UL-TCI state index inside the SRS resource-specific configuration.

The transmission configuration may be available with respect to the PUSCH as in Proposal 3 to be described below. In this case, the following matters may be considered in relation to coexistence of spatialRelationInfo which pre-exists for the transmission beam configuration of PUCCH/PUSCH/SRS and the UL-TCI state configuration. As in spatialRelationInfo, a field for configuring the UL-TCI state configuration mentioned above may exist as an optional form. If the UL-TCI state configuration exists in addition to the spatialRelationInfo configuration, the UE may disregard a transmit bema configuration part and follow the transmit beam/panel configuration of the UL-TCI state in spatialRelationInfo.

Table 12 below shows the UL-TCI state configuration including the panel ID.

to the transmit beam to be utilized/applied at the time of transmitting the target UL channel through the RRC configuration.

An integrated panel indication for all UL channels is available through the IE configuration of the UL-TCI state configuration as in Proposal 1-1.

[Proposal 1-2]

A panel configuration information (PCI) field may be included in the IE of the UL-TCI state configuration instead of the P-ID field which is the information element (IE) of Proposal 1-1 above. The panel configuration information field (or panel configuration information IE) may include at least one of the following information. The embodiment may also be equally applied to proposal schemes (Proposals 2, 3, and 4) to be described below.

① One or multiple panel IDs (P-IDs)

The multiple P-IDs may be utilized for multi-panel simultaneous transmission of multi-panel UEs as shown in Table 14 of Proposal 4 to be described below.

② P-ID-specific UL power control related parameter

For example, the P-ID-specific UL power control related parameter may include an open-loop power control parameter set (e.g., P0, alpha, pathloss value, etc.) and a closed-loop power control parameter set (e.g., TPC command series).

TABLE 12

| Valid UL-TCI state Configuration | P-ID (panel ID) | Reference RS | (Potential) Target UL channel | [qcl-Type] |
|---|---|---|---|---|
| 1 | 1 | SRS resource (for BM) | PUCCH or SRS or PRACH | Spatial-relation |
| 2 | 1 | DL RS(a CSI-RS resource or a SSB) | PUCCH or SRS or PRACH | Spatial-relation |
| 3 | 2 | SRS resource (for BM) | PUCCH or SRS or PRACH | Spatial-relation |
| 4 | 2 | DL RS(a CSI-RS resource or a SSB) | PUCCH or SRS or PRACH | Spatial-relation |
| 5 | 1 | DL RS(a CSI-RS resource or a SSB) | PUSCH | Spatial-relation + [port(s)-indication] |
| 6 | 1 | DL RS(a CSI-RS resource or a SSB) and SRS resource | PUSCH | Spatial-relation + [port(s)-indication] |
| 7 | 1 | SRS resource | PUSCH | Spatial-relation + [port(s)-indication] |
| 8 | 1 | UL RS(a SRS for BM) and SRS resource | PUSCH | Spatial-relation + [port(s)-indication] |
| 9 | 2 | DL RS(a CSI-RS resource or a SSB) | PUSCH | Spatial-relation + [port(s)-indication] |
| 10 | 2 | DL RS(a CSI-RS resource or a SSB) and SRS resource | PUSCH | Spatial-relation + [port(s)-indication] |
| 11 | 2 | SRS resource | PUSCH | Spatial-relation + [port(s)-indication] |
| 12 | 2 | UL RS(a SRS for BM) and SRS resource | PUSCH | Spatial-relation + [port(s)-indication] |

A first row of Table 12 above includes the panel ID, the reference RS, and the target UL channel, and each of the panel ID, the reference RS, and the target UL channel is described above. A QCL type [qcl-Type] has a spatial relation attribute when only the transmit beam (e.g., analog beam) may be just indicated like PUCCH/SRS/PRACH. When up to a port(s) indication and a precoder (e.g., a digital beam) should be indicated through the SRS for the purpose of the 'CB' or 'non-CB' which is previously transmitted like the PUSCH, the QCL type has attributes of the spatial relation and the port indication.

The panel-ID IE exists for each UL-TCI state as in Table 12 above, and the BS may configure/indicate through which panel the target UL channel is to be transmitted in addition ③ P-ID-specific timing advance (TA) value ④ P-ID-specific UL-PTRS port mapping Phase noise may be different for each panel, so mapping information between UL-PTRS ports and the P-ID(s) may be included. An example of the mapping information is as follows. The BS may be configured to transmit UL-PTRS port 0 in P-ID 0, and transmit UL-PTRS port 1 in P-ID 1. That is, the BS may be configured for the UE to explicitly transmit specific UL-PTRS port X in a specific P-ID.

According to an embodiment, the mapping information may be included only when multiple P-IDs (and multiple UL-PTRS ports) are configured. When the mapping information is omitted, a default mapping scheme may be applied. As an example, the default mapping scheme may be a scheme in which the P-ID and the UL PTRS port ID are mapped one to one (in an (ascending/descending) order).

According to an embodiment, multiple UL-PTRS port IDs may be configured in one P-ID based on the mapping information.

According to an embodiment, the number of ports of the UL-PTRS configurable for supporting multi-panel selective transmission and multi-panel simultaneous transmission may increase based on that the number of ports of the UL-PTRS configurable to the UE in the related art is up to 2. That is, the maximum port number of the configurable UL-PTRS may become a multiple of the panel number (e.g., 2*(panel number)).

According to an embodiment, the information of ②, ③, or ④ may be configured as a separate field (s) and/or IE of the UL-TCI state configuration.

The embodiment (introduction of the PCI field or configuration/definition of the information of ②, ③, or ④ for each panel in the UL-TCI state configuration) has the following effect. The configuration/indication/update for each uplink channel is available in the integrated framework such as the UL-TCI state so as to handle the wireless channel situation which may vary for each panel.

In particular, power control related configurations of ② may be configured by relying on each panel of the UE and configured by separately relying on a reference RS (e.g., a source RS of spatialRelationInfo and/or a reference RS of the UL-TCI state) of the UL channel/RS transmit beam. Specifically, in the power control related configuration, the power control parameter set may vary based on the reference RS configured for the transmission of the target uplink channel/reference signal. As an example, a pathloss value or a reference signal received power (RSRP) value may vary when previously receiving a corresponding DL RS according to whether the reference RS of the transmit beam of the UL channel/RS is the SSB-RI or the CRI. When the transmit beam corresponding to the receive beam is used, a power control may be required to be configured differently in order to obtain the same capability according to the DL RS. Therefore, the following behavior may be considered.

When the reference RS configured for the transmit beam varies in the UL channels/RSs (e.g., PUCCH, PUSCH, SRS, PRACH) of the UE, the power control parameter set may vary depending on the corresponding RS.

[Proposal 2]

[Proposal 2-1]

In the UL-TCI state configuration, the reference RS may not be configured in a specific UL-TCI state (e.g., reference RS=N/A or reference RS=[ ](empty), UL-TCI state 5/6 of Table 13 to be described below). The UL-TCI state may be utilized for the SRS resource(s) (target UL channel) to be transmitted for the 'BM' usage.

The SRS resource(s) for the 'BM' usage in which the UL-TCI state is configured may be utilized for an (initial) beam management ((initial) UL beam management) behavior, and the UE may voluntarily determine the transmit beam of the SRS in order to find a best UL beam. The UE may perform beam sweeping through the SRS resource(s) for the 'BM' usage, and the BS may configure/indicate a best beam for sequential uplink channel transmission of the UE by recognizing a UL best beam.

Effects according to the embodiment are as follows.

When the spatial relation of the SRS resource for the 'BM' usage in the related art is not configured, how to configure the transmit beam and/or panel upon transmitting the corresponding SRS is fully handled by the UE. In the embodiment, there may be an effect that the BS indicates a panel to be transmitted for the 'BM' usage SRS through the UL-TCI state to resolve a concern that transmission may be continued to the UE only with a preferred panel.

Additionally, the BS may indicate panel selective UL channel transmission by considering a quality of a panel-specific UL transmit beam (e.g., SRS transmit beam). The BS may configure/indicate multi-panel simultaneous transmission considering a multi-panel-specific UL transmit beam quality of the UE, to a UE capable of multi-panel simultaneous transmission.

[Proposal 2-2]

In the UL-TCI state configuration, the reference RS and the panel ID may not be configured in a specific UL-TCI state (e.g., UL-TCI state 7 of Table 13). The UL-TCI state may be utilized for the SRS resource(s) (target UL channel) to be transmitted for the 'BM' usage.

In order to find a best panel and a best UL beam through the SRS resource(s) for the 'BM' usage in which the UL-TCI state is configured, the UE may voluntarily determine the transmit panel and the transmit beam. The UE may perform panel/beam sweeping through the SRS resource(s) for the 'BM' usage, and the BS may configure/indicate the best beam and the best beam for sequential uplink channel transmission of the UE by recognizing a UL best beam and a UL best beam.

In the embodiment, a discretionary power is granted to the UE even for the panel determination upon transmitting the SRS for the 'BM' usage in addition to Proposal 2-1 above, and as a result, the UE may more flexibly operate in relation to the transmission of the uplink signal.

The UL-TCI state configuration based on two proposals (Proposals 2-1 and 2-2) above may be represented as in Table 13 below (UL-TCI state 5/6/7). Specifically, Table 13 below shows a UL-TCI state configuration in which the panel ID and/or the reference RS are/is not configured.

TABLE 13

| Valid UL-TCI state Configuration | P-ID (panel ID) | Reference RS | (Potential) Target UL channel | [qcl-Type] |
|---|---|---|---|---|
| 1 | 1 | SRS resource (for BM) | PUCCH or SRS or PRACH | Spatial-relation |
| 2 | 1 | DL RS(a CSI-RS resource or a SSB) | PUCCH or SRS or PRACH | Spatial-relation |
| 3 | 2 | SRS resource (for BM) | PUCCH or SRS or PRACH | Spatial-relation |
| 4 | 2 | DL RS(a CSI-RS resource or a SSB) | PUCCH or SRS or PRACH | Spatial-relation |
| 5 | 1 | N/A([a]: empty) | SRS resource (for BM) | Spatial-relation |

TABLE 13-continued

| Valid UL-TCI state Configuration | P-ID (panel ID) | Reference RS | (Potential) Target UL channel | [qcl-Type] |
|---|---|---|---|---|
| 6 | 2 | N/A(*: empty) | SRS resource (for BM) | Spatial-relation |
| 7 | N/A | N/A(*: empty) | SRS resource (for BM) | Spatial-relation |

As in Proposals 2-1 and 2-2 above, the specific UL-TCI state in which the reference RS and/or the P-ID are/is not configured may be configured only in a specific UL channel/RS. As an example, the target UL channel to be used/utilized of the UL-TCI state may be limited to the 'BM' usage SRS (SRS resources in the 'BM' usage SRS resource set). As described above, the target UL channel is limited to prevent the ambiguity of the UE operation.

[Proposal 2-3]

In the specific UL-TCI state, the reference RS may be configured, but the P-ID may not be configured. The UL-TCI state may be utilized for the SRS resource(s) (target UL channel) to be transmitted for the 'BM' usage. The UE may voluntarily determine the transmit panel in order to find the best panel through the 'BM' usage SRS resource(s) in which the corresponding UL-TCI state is configured.

For example, the configured reference RS may be the DL RS, and the UE may measure the corresponding DL RS with multi-panels and the transmit beam for each panel may exist with respect to the same DL RS. Thereafter, in the 'BM' usage SRS resource(s), the UE may determine the panel selection, and then transmit the corresponding SRS. That is, there is an effect that some DL anchor beams are provided to the UE in which the beam correspondence is not complete.

That is, the operations in Proposals 2-2 and 2-3 above intends panel selective transmission in the SRS transmission of the UE, and if the corresponding UL-TCI state is utilized in the SRS resource(s) within the SRS resource set configured for the 'BM' usage, the UE may transmit the SRS based on i) or ii) below.

i) Transmission by changing the panel in units of "contiguous" SRS resource (sequentially transmitting the SRS resources like panel 1, panel 2, panel 1, and panel 2)

ii) Transmission by changing the panel in units of specific SRS resource group (e.g., defining/forming any group among SRS resources in which the same transmit panel is configured by the UE itself) (e.g., first transmitting the SRS resource and switching the transmitted SRS resource for one panel for each group like panel 1, panel 1, panel 2, and panel 2)

In the case of ii) above, a UE which requires a switching delay or an RF retuning time in the panel switching has an advantage in that the delay may be reduced by decreasing the number of panel switching times and wasted resources may be reduced by decreasing a guard period.

Here, the "contiguous" SRS resource may be an SRS resource based on at least one of 1) to 3) below.

1) Contiguous SRS resource(s) when re-ordering/re-indexing global SRS resource IDs (e.g., RRC parameter srs-ResourceId) in the ascending/descending order within the SRS resource set 2) Contiguous SRS resource(s) at each configured time domain location (e.g., symbol level location) of the SRS resource 3) SRS resource(s) in which each configured spatial domain filter of the SRS resource is contiguous (e.g., contiguous in the ascending/descending order) in a (vertical and/or horizontal) angular domain In other words, the contiguous SRS resource(s) may be related to at least one of 1) SRS resource ID arranged in a specific order, 2) a location of each SRS resource in a time domain (e.g., a symbol location), 3) an angular domain of a spatial domain filter configured in each SRS resource.

[Proposal 2-4]

The UL-TCI state in Proposals 2-1, 2-2, and 2-3 above may be configured at an SRS resource set level. Specifically, the UL-TCI state may be configured as a spatial relation source of the SRS resource set level other than an SRS resource level.

This has an effect of reducing the overhead by configuring the spatial relation source once at a set level rather than a resource level (configuring the spatial relation source in one UL-TCI state).

As an example, when the panel ID is configured and the reference RS is not configured for multiple ('BM' usage) SRS resources (the SRS resource set including the multiple ('BM' usage) SRS resources, the UE may apply the same panel ID in transmission of the "contiguous" SRS resources, but apply a different spatial domain filter.

As another example, when neither the panel ID nor the reference RS is configured for multiple ('BM' usage) SRS resources (the SRS resource set including the multiple ('BM' usage) SRS resources, the UE applies a different panel ID and the different spatial domain filter in transmission of the "contiguous" SRS resources.

In particular, when the panel ID is not configured, the UE may transmit the SRS based on i) or ii) below.

i) Transmission by changing the panel in units of "contiguous" SRS resource (sequentially transmitting the SRS resources like panel 1, panel 2, panel 1, and panel 2)

ii) Transmission by changing the panel in units of specific SRS resource group (e.g., defining/forming any group among SRS resources in which the same transmit panel is configured by the UE itself) (e.g., first transmitting the SRS resource and switching the transmitted SRS resource for one panel for each group like panel 1, panel 1, panel 2, and panel 2)

In the case of ii), a UE which requires a switching delay or an RF retuning time in the panel switching has an advantage in that the delay may be reduced by decreasing the number of panel switching times and wasted resources may be reduced by decreasing a guard period.

Here, the "contiguous" SRS resource may be an SRS resource based on at least one of 1) to 3) below.

1) Contiguous SRS resource(s) when re-ordering/re-indexing global SRS resource IDs (e.g., RRC parameter srs-ResourceId) in the ascending/descending order within the SRS resource set 2) Contiguous SRS resource(s) at each configured time domain location (e.g., symbol level location) of the SRS resource 3) SRS resource(s) in which each configured spatial domain filter of the SRS resource is contiguous (e.g., contiguous in the ascending/descending order) in a (vertical and/or horizontal) angular domain In other words, the contiguous SRS resource(s) may be related to at least one of 1) SRS resource ID arranged in a specific order, 2) a location of each SRS resource in a time domain (e.g., a symbol location), 3) an angular domain of a spatial domain filter configured in each SRS resource.

According to an embodiment, the UL-TCI state may be configured for each SRS resource group level. Specifically, the UL-TCI state may be configured as the spatial relation source at the SRS resource group level other than the SRS resource level. The UL-TCI state is configured for each SRS resource group constituting by predetermined resources having the same attribute within the SRS resource set to reduce the overhead and improve the flexibility of the UL-TCI configuration.

According to an embodiment, the UL-TCI may be configured at the PUCCH resource group level. A PUCCH resource group may be introduced, which is constituted by the PUCCH resources. As a result, the UL-TCI state may be configured through the RRC or updated through the MAC-CE even in units of the PUCCH resource group. The PUCCH resource group may mean a PUCCH group to each TRP in multi-TRP transmission. Accordingly, the configuration/indication/update of the (PUCCH resource group unit) UL-TCI state may have an effect of minimum configurability and overhead reduction (for each TRP).

[Proposal 3]

The UL-TCI state may be configured as large as up to n (e.g., n=128) from the BS through the RRC configuration. The BS may link/connect the UL-TCI state to the target uplink channel/RS (e.g., PUCCH, PUSCH, PRACH, SRS) through the RRC configuration. The BS may configure/indicate a panel to be utilized/applied when the UE transmits the corresponding uplink channel/RS through the operation. In particular, for a dynamic panel and transmit beam indication in the PUSCH transmission, the UL-TCI state filed may additionally exist in the SRI field instead of the SRI field in the UL DCI (similarly to the TCI state field of the DL DCI (e.g., 3 bits)). The BS may configure and update m (e.g., m=8) states among a total of n states as a candidate state which is to constitute the UL-TCI state field of the corresponding UL DCI.

There is the following advantage by updating the UL-TCI state field of the UL DCI through a Multiple Access Control-Control Element (MAC-CE).

The BS that receives reporting of the UE for the DL RS and the UL RS of the UE may immediately update a best beam/panel candidate group (UL-TCI state(s)) to candidate UL TCI states of the UL-TCI state field of the UL DCI. Accordingly, the BS may dynamically indicate the best beam/panel among the candidate UL-TCI states upon scheduling the PUSCH.

Alternatively, the SRI field of the UL DCI for indicating information (i.e., rank, TPMI, etc.) required for the PUSCH transmission is left as it is, but information of the UL-TCI state field may be applied to an SRS resource(s) indicated by a codepoint of the SRI for a transmit beam usage instead of a conventional spatial relation. That is, the conventional SRI field may be reused for indicating UL MIMO transmission information (i.e., rank, TPMI, etc.) which is conventional information except for the PUSCH transmit beam in the SRI field. In just PUSCH transmit beam determination, the UL-TCI state may be utilized. The operation serves to supplement a precoder (e.g., digital beam) indication which is a blind spot of the UL-TCI state. On the contrary, only the SRS resources for the 'CB' and 'non-CB' usages are not limited to the candidate of the SRI field, but the SRS resources for the 'BM' usage are also connected to the codepoint of the SRI field to be configured as the SRI candidate upon transmitting the PUSCH.

After the SRS resources for the 'BM' usage of a single-port or multi-ports are transmitted for initial beam sweeping through the additional definition/configuration, the SRS resources are configured/indicated/updated as the SRI candidate immediately without the delay to be used upon scheduling the PUSCH.

[Proposal 4]

In order to support multi-panel simultaneous transmission of the UE, a plurality of panel IDs may be configured in the P-ID which is the IE of the UL-TCI state configuration in Proposal 1 above. Further, a plurality of reference RSs may also be configured for the transmit bema indication for each panel. Table 11 below shows the UL-TCI state based on the embodiment.

In the example of Table 14 below, in the case of UL-TCI state configuration index 3, a plurality of P-IDs is configured, but only one reference RS for the transmit beam is configured. When the corresponding reference RS is the DL RS, the UE measures the corresponding DL RS with the multi-panels and the receive beam for each panel may exist for the same DL RS, and as a result, the UE may perform UL multi-panel simultaneous transmission with the transmit beams corresponding to the receive beam for each panel.

Table 14 below shows the UL-TCI state configuration supporting multi-panel simultaneous transmission.

TABLE 14

| Valid UL-TCI state Configuration | P-ID (panel ID) | Reference RS | (Potential) Target UL channel | [qcl-Type] |
|---|---|---|---|---|
| 1 | 1 | DL RS(a CSI-RS resource or a SSB) | PUSCH | Spatial-relation + [port(s)-indication] |
| | 2 | DL RS(a CSI-RS resource or a SSB) and SRS resource | PUSCH | Spatial-relation + [port(s)-indication] |
| 2 | 1 | SRS resource | PUSCH | Spatial-relation + [port(s)-indication] |
| | 2 | UL RS(a SRS for BM) and SRS resource | PUSCH | Spatial-relation + [port(s)-indication] |
| 3 | 1 | CRI 1 | PUSCH | Spatial-relation + [port(s)-indication] |
| | 2 | CRI 1 | PUSCH | Spatial-relation + [port(s)-indication] |

TABLE 14-continued

| Valid UL-TCI state Configuration | P-ID (panel ID) | Reference RS | (Potential) Target UL channel | [qcl-Type] |
|---|---|---|---|---|
| 4 | 1 | SRS resource 1 | PUSCH | Spatial-relation + [port(s)-indication] |
| | 2 | SRS resource 2 | PUSCH | Spatial-relation + [port(s)-indication] |

A single UL-TCI state is connected to the uplink channel through such a UL-TCI state constitution/configuration to support the multi-panel simultaneous transmission of the UE.

According to an embodiment, the BS links a plurality of conventional UL-TCI states to any uplink channel of the UE in Tables 12 and 13 above to support the multi-panel transmission of the UE upon transmitting the uplink channel. As an example, the BS may link/connect multiple UL-TCI states to one codepoint as RRC description in the UL-TCI state field (e.g., 3-bit field) of the UL DCI of Proposal 3 above, and update the UL-TCI states through the MAC-CE. When the BS indicates the corresponding codepoint of the UL-TCI state field upon scheduling the PUSCH, the UE may transmit the PUSCH by utilizing multiple UL-TCI state panel(s) and transmit beam(s) connected to the codepoint.

The plurality of UL-TCI states is connected to the uplink channel as described above to support multi-panel transmission of the UE.

Information included in a reference RS field based on Tables 12 to 14 of the present disclosure may be an SSB index (e.g., SSB resource index, SSBRI) in the case of the CSI-RS and an SRS resource index (SRI) in the case of the SRS.

Further, when the UL-TCI state configuration of Proposals 1 to 4 of the present disclosure is utilized for the PRACH, the UL-TCI state configuration may be used only for Contention-Free Random Access (CFRA) (e.g., PDCCH-ordered PRACH).

In the proposals (in particular, contents of Proposals 2 and 4) of the present disclosure, a meaning may not be limited within the framework such as the UL-TCI state, and is applicable to a specific procedure indicating the transmit beam for a general UL channel/RS.

In Rel-15/16 NR, spatial relation information (spatialRelationInfo) is used in order for a base station to indicate a Tx beam to be used when the base station transmits an UL channel to a UE. Specifically, the base station configures a DL reference signal (DL RS) (e.g., SSB-RI, CRI (P/SP/AP)) or an SRS (i.e., SRS resource) as a reference RS for a target UL channel or a target RS via RRC configuration. Through this, the base station may configure/indicate which UL Tx beam will be used when the UE transmits the PUCCH and the SRS.

Further, a Tx beam of an SRS (for codebook (CB)/non-codebook (NCB) usage) transmitted through the configuration/indication may be used to indicate a beam for transmitting a PUSCH. Specifically, when the base station schedules the PUSCH to the UE, the Tx beam of the SRS may be indicated as a Tx beam for the PUSCH through an SRS Resource Indicator (SRI) field.

In Rel-17, standardization is being considered for a DL/UL unified TCI framework extending a framework called spatial relation information (spatialRelationInfo). In the DL/UL unified TCI framework, there is a possibility of indicating a Tx beam for UL channel/RS of the UE by configuring/activating/indicating, by the base station, a specific (UL) TCI state ID to a target UL channel/RS of the UE in a (DL/UL unified) TCI state pool.

As above, as an analog beam is used with FR2 as a target in NR, there is a need to consider a limitation of Maximum Permissible Exposure (MPE) that may be harmful to the human body. As a solution to this, two methods to be described later have been proposed. The existing two methods have problems, and thus the present disclosure describes a transmission method considering MPE in UL channel/RS transmission of the UE and a subsequent BS-UE operation.

Regarding matters to be considered for multi-beam enhancement to be described later, the introduction of a DL/UL unified TCI framework is considered, and standardization for UE multiple-panel operation method considering the prevention of a UL coverage loss due to the MPE is in progress (b). There is a probability that an operation related to the multi-beam enhancement will operate in the background of an UL beam indication through the unified TCI framework.

In relation to the multi-beam enhancement, the following matters may be considered.

Enhancement on multi-beam operation, mainly targeting FR2 while also applicable to FR1:

a) Identify and specify features to facilitate more efficient (lower latency and overhead) DL/UL beam management to support higher intra- and L1/L2-centric inter-cell mobility and/or a larger number of configured TCI states:

a-i) Common beam for data and control transmission/reception for DL and UL, especially for intra-band CA a-ii) Unified TCI framework for DL and UL beam indication a-iii) Enhancement on signaling mechanisms for the above features to improve latency and efficiency with more usage of dynamic control signaling (as opposed to RRC)

b) Identify and specify features to facilitate UL beam selection for UEs equipped with multiple panels, considering UL coverage loss mitigation due to MPE, based on UL beam indication with the unified TCI framework for UL fast panel selection As for the MPE avoidance method of the UE, standardization was carried out at RAN4 level. Methods using two MPE avoidance techniques (maxUplinkDutyCycle, P-MPR) are described in detail below.

To meet MPE regulatory requirements, a UE operation according to the following options 1 to 3 (operation of NR UE of FR2) may be considered.

Option 1) Apply 6 dB P-MPR only without maxUplinkDutyCycle restrictions

Option 2) Apply 20% maxUplinkDutyCycle only without P-MPR (Power management-Maximum Power reduction)

Option 3) Apply both P-MPR (Power management-Maximum Power reduction) and maxUplinkDutyCycle The P-MPR may be a power control parameter for limiting the maximum power.

With reference to Table 15 below, the pros and cons of the above-described options are described. Table 15 shows the pros and cons of candidate solutions for MPE regulations.

TABLE 15

| Solution | Pros | Cons |
|---|---|---|
| Option 1 | TDD UL/DL configuration is not limited. Early released UEs can easily meet MPE regulations. | Cell coverage is reduced. Initial access is limited. RAN 2 signaling for P-MPR report from UE is not supported. |
| Option 2 | Cell coverage is maintained Initial access is not limited RAN 2 signaling for reporting of max UplinkDutyCycle from UE is supported Early released UEs can easily meet MPE regulations | TDD UL/DL configuration is limited |
| Option 3 | MPE regulations are easily satisfied | RAN 2 signaling for P-MPR reporting from UE is not supported. Early released UEs do not provide any information on P-MPR and max UplinkDutyCycle to network. |

As an analog beam is used with FR2 as a target in NR, there is a need to consider Maximum Permissible Exposure (MPE) that may be harmful to the human body. The solutions described above have been proposed when a beam of the UE violates the corresponding MPE limitation.

A first method is a P-MPR (Power Management Maximum Power Reduction) method that meets the MPE limitation in the form of backing off direct power. A second method is a method to meet the MPE limitation by defining maxUplinkDutyCycle and limiting a portion that may be used for uplink (UL) in a time axis.

The two solutions have the following disadvantages. The P-MPR has a disadvantage in that uplink (UL) coverage is reduced by directly backing off power. The maxUplinkDutyCycle has a disadvantage in that there is a restriction on the portion for uplink transmission (i.e., restriction on the number of uplink subframes), which degrades throughput.

In order to solve the problem described above, the present disclosure proposes a transmission method considering maximum permissible exposure (MPE) in UL channel/RS transmission of a UE and describes a subsequent BS-UE operation.

In the present disclosure, '/' can be interpreted as 'and', 'or', or 'and/or' based on the context.

[Proposal 5]

A UE may report, to a base station, a preferred UL panel or/and a non-preferred UL panel considering MPE. Hereinafter, an UL panel preferred by the UE is referred to as a 'preferred UL panel', and an UL panel not preferred by the UE is referred to as a 'non-preferred UL panel'.

[Proposal 5-1]

A UE may report, to a base station, a preferred UL panel or/and a non-preferred UL panel (considering MPE) from an UL perspective upon beam reporting. Specifically, the report for the preferred UL panel/non-preferred UL panel may be involved in a report for a best DL RS based on L1-RSRP (Reference Signal Received Power) or L1-SINR (Signal to Interference plus Noise Ratio). For example, information on the preferred UL panel or/and the non-preferred UL panel may be included in CSI including information (CRI/SSBRI) indicating the DL RS determined based on the L1-RSRP/L1-SINR.

The preferred UL panel may be determined as a panel satisfying at least one of conditions according to the following i) to iv).

i) Panel not facing a human body direction (recognized by sensing of UE itself) (e.g., when a direction of the panel is not the human body direction)

ii) Panel in which max power reduction does not occur by P-MPR iii) Panel in which a portion of an UL slot in a time domain is not limited by maxUplinkDutyCycle iv) Panel with more (panel-level) power headroom for an UL channel/RS to which the corresponding transmission is configured/indicated (e.g., panel with the largest power headroom per panel among panels to which UL transmission is configured/indicated)

The non-preferred UL panel may be determined as a panel satisfying at least one of conditions according to the following i) to iv).

i) Panel facing a human body direction (recognized by sensing of UE itself) (e.g., when a direction of the panel is the human body direction)

ii) Panel in which max power reduction occurs by P-MPR iii) Panel in which a portion of an UL slot in a time domain is limited by maxUplinkDutyCycle iv) Panel with less (panel-level) power headroom for an UL channel/RS to which the corresponding transmission is configured/indicated (e.g., panel with the smallest power headroom per panel among panels to which UL transmission is configured/indicated)

The report for the preferred UL panel or/and the non-preferred UL panel of the UE may include an explicit/implicit panel index (ID). In a beam reporting operation of the UE, the UE may perform the report for the preferred/non-preferred panel through the report of the corresponding ID (in addition to best DL RS report).

Here, the explicit panel ID may mean an explicit ID for Rx or Tx panel or an explicit ID for a Tx/Rx combined panel from a DL or UL perspective.

The implicit panel ID is based on a concept that is shared for panel entity between the BS and the UE by BS-UE configuration. Specifically, the corresponding (DL/UL) panel ID may correspond to PUCCH group ID, SRS resource set ID, specific codepoint(s) of SRI field, specific codepoint(s) of UL-TCI state field, and specific TCI state ID(s). That is, based on the BS-UE configuration, any one of the PUCCH group ID, the SRS resource set ID, the specific codepoint(s) of SRI field, the specific codepoint(s) of UL-TCI state field, and the specific TCI state ID(s) may represent the implicit panel ID.

The UE may report, to the base station, the explicit/implicit panel ID related to the preferred UL panel or/and the non-preferred UL panel. Through this, the base station may configure/indicate the corresponding UE panel (preferred UL panel/non-preferred UL panel) to be used/not to be used for scheduling for the UL channel/RS.

As another example for the report for the preferred UL panel or/and the non-preferred UL panel of the UE, 1-bit indication method may be considered. In the beam reporting operation of the UE, when panel-specific best DL RS report is introduced, the UE may perform 1-bit indication as follows.

The UE may perform a 1-bit indication for preference/non-preference for UL transmission on each of N beam(s) (e.g., N DL RS(s)) (e.g., preference='1' and non-preference='0' or preference='0' and non-preference='1') while performing reporting for N beam(s) (for each panel) related to a DL best beam. The 1-bit indication may be performed for each panel.

That is, the UE may allow 1-bit indication information indicating preference or non-preference related to MPE for each beam (each panel) to be included in the reporting for N beam(s).

(Because the panel-specific best DL RS report is performed) the base station may configure/indicate a UE panel associated/corresponding to a DL RS reported as non-preference based on the 1-bit indication for preference/non-preference not to be used for scheduling for the UL channel/RS.

For another example, the UE may perform a report for a preferred UL panel or/and non-preferred UL panel of the UE using L1-RSRP/L1-SINR value on each of N beam(s) while performing reporting for N beam(s) related to the DL best beam.

Specifically, when the UE reports L1-RSRP/L1-SINR value (or a difference value with L1-RSRP/L1-SINR value of the best beam) of each of N beam(s) (e.g., N DL RS(s)), the UE may operate based on the following i) or ii).
  i) The UE does not report L1-RSRP/L1-SINR for a (panel associated/corresponding to) non-preferred DL RS.
  ii) The UE reports a specific (default) codepoint (e.g., '0000000' in 7-bit payload for a best beam, or '0000' in 4-bit payload for a non-best beam).

As above, the UE may perform a report for the non-preferred DL RS or/and panel through the operation based on the i) or ii).

New report quantity may be additionally supported/defined to support examples of the UE reporting operation. For example, a separate configuration/mode (e.g., report quantity with non-preferred beam/panel for UL) may be added to the report configuration.
[Proposal 5-2]

A UE may report together power headroom value or/and Pcmax value (considering P-MPR) for each panel upon beam reporting.

Specifically, a report for the power headroom value or/and Pcmax value (considering P-MPR) for each panel may be involved in a report for a best DL RS based on L1-RSRP (Reference Signal Received Power) or L1-SINR (Signal to Interference plus Noise Ratio). For example, the power headroom value or/and Pcmax value (considering P-MPR) for each panel may be included in CSI including information (CRI/SSBRI) indicating the DL RS determined based on the L1-RSRP/L1-SINR.

A large number of candidate values for the report for the power headroom (PH) value or/and Pcmax value of the UE may be pre-configured by the base station.

For example, in the PH value, quantized values of x dB step size (e.g., x=2, 3, . . . ) or a table related to the PH value may be pre-defined/pre-configured by the base station. The UE may report, to a base station, a power headroom value corresponding to each panel among the configured candidate values. Through this, the PH value per panel reported by the UE may be reported as a reduced payload size.

Further, in the Pcmax value, candidate values (e.g., 23 dBm, 20 dBm, 17 dBm, 14 dBm) of n values may be pre-defined/pre-configured to the UE by the base station. The UE may report, to the base station, a Pcmax value corresponding to each panel among the configured candidate values. Through this, the Pcmax value per panel reported by the UE may be reported as a reduced payload size (i.e., $\log_2$ n bit).

The UE may perform the report for the PH value or/and Pcmax value based on the following i) or ii).
  i) The UE performs the report based on the Pcmax value that is power-backed off by P-MPR.
  ii) The UE performs a report for a maximum PH/Pcmax value that is not violated by MPE among the pre-defined/pre-configured candidate values of the Pcmax value.

In the ii), the PH value or/and Pcmax value reported for each panel are as follows. A maximum value that is not violated by the MPE among one or more candidate values of the PH/Pcmax value related to each panel may be reported.

The base station may determine, based on the report for the PH value or/and Pcmax value received from the UE, that a panel based on the following 1) and/or 2) has an MPE issue (which violates MPE limitation).
  1) Panel without the power headroom
  2) Panel with the low Pcmax value The panel according to the 1) means a panel with little or no power headroom as P_cmax is reduced by P-MPR value. That is, scheduling may not be easy through the panel according to the 1).

The base station may perform scheduling for UL channel/RS on the UE based on a panel other than the panel based on the 1) and/or 2).

An UL channel/RS (e.g., PUCCH, PUSCH, SRS) that is the basis of the report for the PH value or/and Pcmax value may be pre-configured/pre-indicated by the base station. That is, a type (i.e., type 1, 2, or 3) of the PH/Pcmax report may be determined by the pre-configuration/pre-indication.

For example, when the UL channel/RS that is the basis of the PH/Pcmax report is the PUSCH, type 1 PH report may be performed by the proposal 5-2. For example, when the UL channel/RS that is the basis of the PH/Pcmax report is the SRS, type 3 PH report may be performed by the proposal 5-2.

New report quantity may be additionally supported/defined to support examples of the UE reporting operation. For example, a separate configuration/mode (e.g., report quantity with PHR/Pcmax per panel) may be added to the report configuration.
[Proposal 5-3]

A UE may report a value related to a preferred DL RS upon beam reporting.

The beam reporting may be a report for a DL RS based on L1-RSRP (Reference Signal Received Power) or L1-SINR (Signal to Interference plus Noise Ratio). Specifically, the UE reports a value related to a preferred DL RS (e.g., CRI/SSB-RI) upon the reporting for best/non-best DL RS.

The value related to the preferred DL RS may include at least one of the following i) or ii).
  i) L1-RSRP/L1-SINR value when receiving (the preferred DL RS) as a best Rx beam of each Rx panel of the UE
  ii) Offset value for a reception value (i.e., L1-RSRP/L1-SINR value) in a best Rx panel Each Rx panel of the UE may be an activated Rx panel at the moment of measuring DL RS(s). Or/and, each Rx panel of the UE may be an Rx panel that is configured/indicated so that a base station performs the measurement through CSI reporting configuration or DL RS configuration.

The UE reports a value for each Rx panel related to preferred DL RS(s) not reporting a single L1-RSRP/L1-SINT value for the preferred DL RS(s) upon the beam reporting.

Specifically, the UE does not report the single L1-RSRP/L1-SINR value for each of preferred DL RS(s) with good reception sensitivity (from a L1-RSRP/L1-SINR perspective) among DL RS(s) configured/indicated for beam measurement usage. Instead of reporting the single L1-RSRP/L1-SINR value, the UE may report L1-RSRP/L1-SINR value per Rx panel when the preferred DL RS(s) has been received based on a best Rx beam of each Rx panel of the UE.

As above, the UE may report as many L1-RSRP/L1-SINR values as the number of (activated) Rx panels for the preferred DL RS(s).

The operation according to the present embodiment has the following purposes/effects.

When the base station performs an UL Tx beam (or/and Tx panel) indication through the preferred DL RS, the UE performs a transmission of UL channel/RS to an UL Tx beam (or/and Tx panel) corresponding to a Rx beam (or/and Rx panel) of the corresponding DL RS. In this instance, when the corresponding UL Tx beam (or/and Tx panel) violates the MPE, the UE may perform transmission of the UL channel/RS based on an UL Tx beam corresponding to the corresponding DL RS Rx beam in another Rx panel (e.g., second-best Rx panel). That is, when a (best Rx) panel related to the indicated DL RS needs to be changed due to the MPE issue, the UE may change the panel and perform the UL transmission without additional signaling.

For example, when the base station has indicated a transmission of UL channel/RS of the UE through a specific CRI (and (Rx) panel #0) after the UE reporting based on the proposal 5-3, there may occur a case in which (Rx) panel #0 of the UE is a best (Rx) panel for the CRI, but the panel #0 cannot be used for the UL transmission due to the MPE issue (e.g., corresponding to violation of the MPE limitation, the above-described non-preferred UL panel, etc.). In this case, based on the reporting according to the proposal 5-3, the UE may quickly (autonomously) switch the panel #0 to panel #1 and perform the transmission of UL channel/RS. Since the UL panel switching and UL beam switching of the UE is performed based on the CRI (CSI-RS Resource Indicator), the base station does not need to change the UL Rx beam for the UL transmission of the UE.

Based on reporting information of the proposal 5-3, the base station may figure out L1-RSRP/L1-SINR offset (difference) value from a DL perspective. The L1-RSRP/L1-SINR offset (difference) value may refer to a difference value between L1-RSRP/L1-SINR value of a first-best Rx panel (e.g., panel #0) and L1-RSRP/L1-SINR value of a second-best Rx panel (e.g., panel #1). When retransmission of the UL transmission is required, the base station may determine and indicate an MCS for UL transmission with reference to the difference value.

In the (autonomous) Tx panel switching of the UE due to the MPE issue after the reporting of the proposal 5-3, pre-configuration/pre-definition between the BS and the UE (e.g., second-best Rx panel, etc.) may exist for a target panel. Or/and, an indicator that the UE has performed the (autonomous) Tx panel switching upon UL transmission may be included in the UL transmission. The corresponding information (information related to autonomous panel switching by the UE) may be used for subsequent UL transmission configuration/indication through the above operation.

Specifically, when the base station indicates the UL transmission for the UE to the corresponding CRI, the base station may recognize that the (autonomous) Tx panel switching of the UE has been performed in the (CRI based) preceding UL transmission. The base station may adaptively perform configuration/indication for various parameters (e.g., MCS) on the panel switching in the UL scheduling and the UL transmission.

New report quantity may be additionally supported/defined to support examples of the UE reporting operation. For example, a separate configuration/mode (e.g., report quantity with L1-RSRP/L1-SINR per (activated) Rx panel) may be added to the report configuration.

The proposal 5 has described the method of avoiding the MPE issue in the UL channel/RS transmission of the UE through the multi-panel UE operation. When a specific panel of the UE is directed toward the human body, there is a probability that most of beams of the corresponding panel may be directed toward the human body, and thus the effect as beam-level MPE mitigation may be insignificant. Based on the methods according to the above-described proposal 5, the MPE issue can be effectively avoided/prevented through panel-level MPE mitigation.

[Proposal 6]

It has been assumed that the report of the proposal 5 (the proposals 5-1 and 5-2) is involved in the beam reporting, but the present disclosure is not limited thereto. Methods, in which the report of the proposal 5 (the proposals 5-1 and 5-2) is performed through manners other than the beam reporting, are described below.

[Proposal 6-1]

A UE may perform a report for the preferred/non-preferred panel of the proposal 5-1 through a scheduling request (SR).

Specifically, the UE may perform the report for the preferred/non-preferred panel of the proposal 5-1 using a scheduling request (SR) PUCCH. For example, an SR ID may be configured for a usage of the report for the preferred/non-preferred panel using the same PUCCH format as the SR.

The report for the preferred/non-preferred panel using the SR PUCCH may be performed based on the following i) or ii).

i) Information on the report for the preferred/non-preferred panel is added to a PUCCH format or/and MAC CE message format for the existing SR PUCCH and is reported together when a transmission event of the existing SR PUCCH occurs.

ii) When the MPE issue including only information on the report for the preferred/non-preferred panel occurs (the i) to iv) of the proposal 5-1), the report is performed using a dedicated (SR) PUCCH format as an event-based trigger.

For example, a base station may configure an SR PUCCH resource per UL panel, and the UE may transmit an SR PUCCH resource configured for a preferred panel (without the MPE issue) from an UL prospective (upon a scheduling request process). Through this, the base station may indicate transmission through an UL panel preferred (without the MPE issue) by the UE upon the PUSCH scheduling and configure/indicate transmission for another UL channel/RS resource through the corresponding UL panel.

For another example, the UE may transmit an SR PUCCH resource configured for a panel with the MPE issue when performing an SR procedure and may inform the base station that the MPE issue has occurred in the corresponding panel.

For another example, the base station may separately configure PUCCH/PRACH resource as a usage for reporting whether the UL MPE issue of the UE occurs, in the same manner as the SR. The PUCCH/PRACH resource may be a panel-specific resource or a panel-common resource.

Specifically, when the UE performs UL transmission using a specific UL beam/panel configured/indicated by the base station, a power back-off may have to be seriously performed (due to the MPE issue). That is, there may occur a case in which a reduction in maximum power according to the power back-off is very large. In this case, the UE/BS may operate as follows.

The UE may report whether a problem occurs with respect to the current UL beam/panel via the PUCCH/PRACH.

The base station receiving the report may perform configuration/instruction of the following i) or ii) to the UE with respect to subsequent UL transmission.

i) Change to an UL Tx beam based on other DL/UL RS ii) Change an UL Tx panel to other (UL) panel

[Proposal 6-2]

A UE may perform a report for PH value or/and Pcmax value for each panel in the proposal 5-2 based on a specific event occurring.

The specific event may be defined to occur based on a threshold related to at least one of the PH value or the Pcmax value. For example, the specific event may be defined to occur based on at least one of the following i) or ii).

i) If the PH value is reduced to be equal to or less than a specific threshold ii) If the Pcmax value is reduced to be equal to or less than the specific threshold When the specific event occurs, the UE may perform a report according to the proposal 5-1 and/or the proposal 5-2 using a dedicated (SR) PUCCH format. That is, the UE may perform the report for the preferred/non-preferred panel of the proposal 5-1, or perform the report for the PH value or/and Pcmax value for each panel of the proposal 5-2.

For the above report, an existing power headroom report (PHR) related MAC CE message format may be enhanced and used. For example, PH/Pcmax value for a (pre-configured) specific channel/RS of PCell and/or SCell per panel may be reported through the MAC CE message for power headroom report (PHR).

Based on the operation of the proposal 6, the base station may acquire information on the preferred/non-preferred panel of the UE through a different method from the proposal 5. Further, there is an advantage that the MPE issue can be avoided through a method of reusing/enhancing the existing SR resource or PHR resource.

[Proposal 7]

A UE may report a list of (DL) RS IDs which cannot be configured/indicated with a reference RS for UL beam or/and a pathloss reference RS for calculating a pathloss compensation value due to the MPE issue.

The UE may report a list of (non-preferred) panel IDs which cannot be configured/indicated for UL channel/RS transmission usage due to the MPE issue.

The (DL) RS ID may include a resource ID such as CRI/SSB-RI/SRS (for BM) or a (DL/UL unified) TCI state ID, or the like. The panel ID may include an explicit/implicit panel ID.

A base station may include/configure/list-up list(s) (of RRC level) for the reference RS or/and the panel ID that are not preferred for UL usage by the UE, as UE-dedicated list(s).

The base station may not use the reference RS or/and the panel ID existing in the list(s) for the UL channel/RS transmission (or pathloss reference RS).

A report for the list(s) by the UE may include RS ID/panel ID to be added to the list(s) and RS ID/panel ID to be deleted (or released) from the list(s).

The proposals 5, 6, and 7 may be independently applied to the operation of the BS/UE. However, the present disclosure is not limited thereto, and two or more of proposals 5 to 7 may be combined and applied to the operation of the BS/UE.

In the above-described embodiments, the Tx beam configuration/indication may mean i) configuration/indication for a reference RS of spatial relation information or/and ii) configuration/indication for a reference RS of a DL/UL unified TCI state.

In the above, the Tx beam configuration/indication of PUCCH/PUSCH may be interpreted as Tx beam configuration/indication for PUCCH DMRS/PUSCH DMRS.

From an implementation perspective, the operations (e.g., operations related to transmission/reception of uplink signals based on at least one of the proposals 1-1, 2-1, 2-2, 2-3, 2-4, 3, 4, 5-1, 5-2, 6-1, 6-2, and 7) of the BS/UE according to the above-described embodiments may be processed by a device (e.g., processors 102 and 202 of FIG. 26) of FIGS. 25 to 29 to be described later.

The operations (e.g., operations related to transmission/reception of uplink signals based on at least one of the proposals 1-1, 2-1, 2-2, 2-3, 2-4, 3, 4, 5-1, 5-2, 6-1, 6-2, and 7) of the BS/UE according to the above-described embodiments may be stored in a memory (e.g., memories 104 and 204 of FIG. 26) in the form of commands/programs (e.g., instructions, executable codes, etc.) for running at least one processor (e.g., processors 102 and 202 of FIG. 26).

A signaling procedure to which the method (the proposals 1 to 7) described in the present disclosure is applied is described in detail below with reference to FIGS. 17 to 22. Embodiments (methods according to one or more of the proposals 1 to 7) applied to operations to be described later are merely examples, and the application of other proposals to the signaling procedure is not limited. For example, one of embodiments according to the proposals 1 to 7 may be independently applied to a signaling procedure according to FIGS. 17 to 22. For example, two or more of embodiments according to the proposals 1 to 7 may be combined and applied to the signaling procedure.

FIG. 17 illustrates a PUCCH transmission procedure to which a method proposed in the present disclosure is applied.

Specifically, FIG. 17 illustrates an example of a PUCCH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 25 to 29 to be described below). FIG. 17 is just for convenience of the description and does not limit the scope of the present disclosure. Further, some step(s) illustrated in FIG. 17 may be omitted according to a situation and/or a configuration.

Below, the signaling procedure from a UE operation perspective will be described.

The UE may transmit UE capability information to the BS (S1710). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S1710 described above may be implemented by devices of FIGS. 25 to 29 to be described below. For example, referring to FIG. 26, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1720). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the UE which receives the UL TCI state related configuration in step S1720 described above may be implemented by the devices in FIGS. 25 to 29 to be described below. For example, referring to FIG. 26, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, a PUCCH related configuration (e.g., PUCCH-Config, etc.) (S1730). The PUCCH related configuration may include configuration information related to the PUCCH transmission of the UE, and may be delivered through higher layer signaling (e.g., RRC signaling), etc. For example, the PUCCH related configuration may include configuration and/or indication information for a panel/beam related to the PUCCH transmission. As an example, the PUCCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUCCH transmission (e.g., PUCCH resource). As an example, spatialrelationInfo which is information related to the PUCCH transmission and the UL TCI state may be each independently configured according to a situation or a case, or configured in combination with each other.

For example, the operation of the UE which receives the PUCCH related configuration in step S1730 described above may be implemented by the devices in FIGS. 25 to 29 to be described below. For example, referring to FIG. 26, one or more processors 102 may control one or more transceivers 106 and/or one or more memories 104 so as to receive the PUCCH related configuration, and one or more transceivers 106 may receive, from the BS, the PUCCH related configuration.

The UE may transmit, to the BS, the PUCCH based on the PUCCH related configuration (S1740). As an example, when the UE receives, from the BS, a configuration for DL data (e.g., PDSCH) and/or CSI reporting (after receiving the PUCCH related configuration), the corresponding UE may transmit ACK/NACK information for the DL data and/or CSI for the CSI reporting through the PUCCH. With respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the PUCCH (through the panel(s) and/or beam(s) (e.g., a spatial filter related to the reference RS) indicated by the UL TCI state) based on the configured/indicated UL TCI state.

For example, the operation of the UE which transmits the PUCCH in step S1740 described above may be implemented by the devices in FIGS. 25 to 29 to be described below. For example, referring to FIG. 26, one or more processors 102 may control one or more transceivers 106 and/or one or more memories 104 so as to transmit the PUCCH, and one or more transceivers 106 may transmit the PUCCH to the BS.

Below, the signaling procedure from a BS operation perspective will be described.

The BS may receive UE capability information from the UE (S1710). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1710 described above may be implemented by devices in FIGS. 25 to 29 to be described below. For example, referring to FIG. 26, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1720). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the BS which transmits the UL TCI state related configuration in step S1720 described above may be implemented by the devices in FIGS. 25 to 29 to be described below. For example, referring to FIG. 26, one or more processors 202 may control one or more transceivers 206 and/or one or more memories 204 so as to transmit the UL TCI state related configuration, and one or more transceivers 206 may transmit, to the UE, the UL TCI state related configuration.

The BS may transmit, to the UE, a PUCCH related configuration (e.g., PUCCH-Config, etc.) (S1730). The PUCCH related configuration may include configuration information related to the PUCCH transmission of the UE, and may be delivered via higher layer signaling (e.g., RRC signaling), etc. For example, the PUCCH related configuration may include configuration and/or indication information for a panel/beam related to the PUCCH transmission. As an example, the PUCCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUCCH transmission (e.g., PUCCH resource). As an example, spatialrelationInfo which is information related to the PUCCH transmission and the UL TCI state may be each independently configured according to a situation or a case, or configured in combination with each other.

For example, the operation of the BS which transmits the PUCCH related configuration in step S1730 described above may be implemented by the devices in FIGS. 25 to 29 to be described below. For example, referring to FIG. 26, one or more processors 202 may control one or more transceivers 206 and/or one or more memories 204 so as to transmit the PUCCH related configuration, and one or more transceivers 206 may transmit, to the UE, the PUCCH related configuration.

The BS may receive, from the UE, the PUCCH transmitted based on the PUCCH related configuration (S1740). As an example, when the BS receives, from the BS, a configuration for DL data (e.g., PDSCH) and/or CSI reporting (after receiving the PUCCH related configuration), the corresponding BS may receive ACK/NACK information for the DL data and/or CSI for the CSI reporting through the PUCCH. With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PUCCH transmitted based on the configured/indicated UL TCI state.

For example, the operation of the BS which receives the PUCCH in step S1740 described above may be implemented by the devices in FIGS. 25 to 29 to be described below. For example, referring to FIG. 26, one or more processors 202 may control one or more transceivers 206 and/or one or more memories 204 so as to receive the PUCCH, and one or more transceivers 206 may receive the PUCCH from the UE.

FIG. 18 illustrates an SRS transmission procedure to which a method proposed in the present disclosure is applied.

Specifically, FIG. 18 illustrates an example of an SRS signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 25 to 29 to be described below). FIG. 18 is just for convenience of the description and does not limit the scope of the present disclosure. Further, some step(s) illustrated in FIG. 18 may be omitted according to a situation and/or a configuration.

Below, the signaling procedure from a UE operation perspective will be described.

The UE may transmit UE capability information to the BS (S1810). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S1810 described above may be implemented by the devices of FIGS. 25 to 29 to be described below. For example, referring to FIG. 26, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1820). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the UE which receives the UL TCI state related configuration in step S1820 described above may be implemented by the devices in FIGS. 25 to 29 to be described below. For example, referring to FIG. 26, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, an SRS Related configuration (e.g., SRS-Config, etc.) (S1830). The SRS related configuration may include configuration information related to the SRS transmission of the UE, and may be delivered through higher layer signaling (e.g., RRC signaling), etc. For example, the SRS related configuration may include configuration and/or indication information for a panel/beam related to the SRS transmission. As an example, the SRS related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding SRS transmission (e.g., SRS resource/SRS resource set). As an example, spatialrelationInfo which is information related to the SRS transmission and the UL TCI state may be each independently configured according to a situation or a case, or configured in combination with each other.

For example, the operation of the UE which receives the SRS related configuration in step S1830 described above may be implemented by the devices in FIGS. 25 to 29 to be described below. For example, referring to FIG. 26, one or more processors 102 may control one or more transceivers 106 and/or one or more memories 104 so as to receive the SRS related configuration, and one or more transceivers 106 may receive, from the BS, the SRS related configuration.

The UE may transmit, to the BS, the SRS based on the SRS related configuration (S1840). With respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the SRS (through the panel(s) and/or beam(s) (e.g., a spatial filter related to the reference RS) indicated by the UL TCI state) based on the configured/indicated UL TCI state.

For example, the operation of the UE which transmits the SRS in step S1840 described above may be implemented by the devices in FIGS. 25 to 29 to be described below. For example, referring to FIG. 26, one or more processors 102 may control one or more transceivers 106 and/or one or more memories 104 so as to transmit the SRS, and one or more transceivers 106 may transmit the SRS to the BS.

Below, the signaling procedure from a BS operation perspective will be described.

The BS may receive UE capability information from the UE (S1810). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1810 described above may be implemented by devices in FIGS. 25 to 29 to be described below. For example, referring to FIG. 26, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1820). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the BS which transmits the UL TCI state related configuration in step S1820 described above may be implemented by the devices in FIGS. 25 to 29 to be described below. For example, referring to FIG. 26, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, an SRS related configuration (e.g., SRS-Config, etc.) (S1830). The SRS related configuration may include configuration information related to the SRS transmission of the UE, and may be delivered through higher layer signaling (e.g., RRC signaling), etc. For example, the SRS related configuration may include configuration and/or indication information for a panel/beam related to the SRS transmission. As an example, the SRS related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding SRS transmission (e.g., SRS resource/SRS resource set). As an example, spatialrelationInfo which is information related to the SRS transmission and the UL TCI state may be each independently configured according to a situation or a case, or configured in combination with each other.

For example, the operation of the BS which transmits the SRS related configuration in step S1830 described above may be implemented by the devices in FIGS. 25 to 29 to be described below. For example, referring to FIG. 26, one or more processors 202 may control one or more transceivers 206 and/or one or more memories 204 so as to transmit the SRS related configuration, and one or more transceivers 206 may transmit, to the UE, the SRS related configuration.

The BS may receive, from the UE, the SRS transmitted based on the SRS related configuration (S1840). With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, an SRS transmitted based on the configured/indicated UL TCI state.

For example, the operation of the BS which receives the SRS in step S1840 described above may be implemented by the devices in FIGS. 25 to 29 to be described below. For example, referring to FIG. 26, one or more processors 202 may control one or more transceivers 206 and/or one or more memories 204 so as to receive the SRS, and one or more transceivers 206 may receive the SRS to the UE.

FIG. 19 illustrates a PUSCH transmission procedure to which a method proposed in the present disclosure is applied.

Specifically, FIG. 19 illustrates an example of a PUSCH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 25 to 29 to be described below). FIG. 19 is just for convenience of the description and does not limit the scope of the present disclosure. Further, some step(s) illustrated in FIG. 19 may be omitted according to a situation and/or a configuration.

Below, the signaling procedure from a UE operation perspective will be described.

The UE may transmit UE capability information to the BS (S1910). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of the UE which transmits the UE capability information in step S1910 described above may be implemented by the devices in FIGS. 25 to 29 to be described below. For example, referring to FIG. 26, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1920). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the UE which receives the UL TCI state related configuration in step S1920 described above may be implemented by the devices in FIGS. 25 to 29 to be described below. For example, referring to FIG. 26, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, a PUSCH related configuration (e.g., PUSCH-Config, etc.) (S1930). The PUSCH related configuration may include configuration information related to the PUSCH transmission of the UE, and may be delivered through higher layer signaling (e.g., RRC signaling), etc. For example, the PUSCH related configuration may include configuration and/or indication information for a panel/beam related to the PUSCH transmission. As an example, the PUSCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUSCH transmission (e.g., PUSCH resource). As an example, spatialrelationInfo which is information related to the PUSCH transmission and the UL TCI state may be each independently configured according to a situation or a case, or configured in combination with each other.

For example, the operation of the UE which receives the PUSCH related configuration in step S1930 described above may be implemented by the devices in FIGS. 25 to 29 to be described below. For example, referring to FIG. 26, one or more processors 102 may control one or more transceivers 106 and/or one or more memories 104 so as to receive the PUSCH related configuration, and one or more transceivers 106 may receive, from the BS, the PUSCH related configuration.

The UE may additionally receive a UL TCI state related MAC-CE from the BS (S1940). For example, as in the above-described proposal method (e.g., Proposal 1 (Proposal 1-1/1-2)/Proposal 2 (Proposal 2-1/2-2/2-3/2-4), Proposal 3/Proposal, etc.), the MAC-CE may be to update a mapping relationship (e.g., codepoint) of the UL TCI state field included in the UL DCI. Mapping information of the UL TCI state field included in the UL DCI for scheduling the PUSCH may also be updated through the MAC-CE.

For example, the operation of the UE which receives the MAC-CE in step S1940 described above may be implemented by the devices in FIGS. 25 to 29 to be described below. For example, referring to FIG. 26, one or more processors 102 may control one or more transceivers 106 and/or one or more memories 104 so as to receive the MAC-CE, and one or more transceivers 106 may receive the MAC-CE from the BS.

The UE may receive, from the BS, UL DCI for PUSCH scheduling (S1950). Here, the UL TCI may include (indication) information (e.g., field) for the UL TCI state such as the above-described method (e.g., Proposal 1 (Proposal 1-1/1-2)/Proposal 2 (Proposal 2-1/2-2/2-3/2-4), Proposal 3/Proposal 4, etc.). Further, the corresponding UL DCI may include an SRI field, etc., and the SRI field may coexist with information on the UL TCI state.

For example, the operation of the UE which receives the UL DCI in step S1950 described above may be implemented by the devices in FIGS. 25 to 29 to be described below. For example, referring to FIG. 26, one or more processors 102 may control one or more transceivers 106 and/or one or more memories 104 so as to receive the UL DCI, and one or more transceivers 106 may receive the UL DCI from the BS.

The UE may transmit, to the BS, the PUSCH based on information on the UL TCI state (S1960). Here, the information on the UL TCI state may be a UL TCI state indicating a panel/beam for PUSCH transmission. For example, with respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the PUSCH (through the panel(s) and/or beam(s) (e.g., a spatial filter related to the reference RS) indicated by the UL TCI state) based on the configured/indicated UL TCI state.

For example, the operation of the UE which transmits the PUSCH in step S1960 described above may be implemented by the devices in FIGS. 25 to 29 to be described below. For example, referring to FIG. 26, one or more processors 102 may control one or more transceivers 106 and/or one or more memories 104 so as to transmit the PUSCH, and one or more transceivers 106 may transmit the PUSCH to the BS.

Below, the signaling procedure from a BS operation perspective will be described.

The BS may receive UE capability information from the UE (S1910). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1910 described above may be implemented by devices in FIGS. 25 to 29 to be described below. For example, referring to FIG. 26, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1920). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the BS which transmits the UL TCI state related configuration in step S1920 described above may be implemented by the devices in FIGS. 25 to 29 to be described below. For example, referring to FIG. 26, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, a PUSCH related configuration (e.g., PUSCH-Config, etc.) (S1930). The PUSCH related configuration may include configuration information related to the PUSCH transmission of the UE, and may be delivered through higher layer signaling (e.g., RRC signaling), etc. For example, the PUSCH related configuration may include configuration and/or indication information for a panel/beam related to the PUSCH transmission. As an example, the PUSCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUSCH transmission (e.g., PUSCH resource). As an example, spatialrelationInfo which is information related to the PUSCH transmission and the UL TCI state may be each independently configured according to a situation or a case, or configured in combination with each other.

For example, the operation of the BS which transmits the PUSCH related configuration in step S1930 described above may be implemented by the devices in FIGS. 25 to 29 to be described below. For example, referring to FIG. 26, one or more processors 202 may control one or more transceivers 206 and/or one or more memories 204 so as to transmit the PUSCH related configuration, and one or more transceivers 206 may transmit, from the BS, the PUSCH related configuration.

The BS may additionally transmit a UL TCI state related MAC-CE to the UE (S1940). For example, as in the above-described proposal method (e.g., Proposal 1 (Proposal 1-1/1-2)/Proposal 2 (Proposal 2-1/2-2/2-3/2-4), Proposal 3/Proposal, etc.), the MAC-CE may be to update a mapping relationship (e.g., codepoint) of the UL TCI state field included in the UL DCI. Mapping information of the UL TCI state field included in the UL DCI for scheduling the PUSCH may also be updated through the MAC-CE.

For example, the operation of the BS which transmits the MAC-CE in step S1940 described above may be implemented by the devices in FIGS. 25 to 29 to be described below. For example, referring to FIG. 26, one or more processors 202 may control one or more transceivers 206 and/or one or more memories 204 so as to transmit the MAC-CE, and one or more transceivers 206 may transmit the MAC-CE from the BS.

The BS may transmit, to the UE, UL DCI for PUSCH scheduling (S1950). Here, the UL TCI may include (indication) information (e.g., field) for the UL TCI state such as the above-described method (e.g., Proposal 1 (Proposal 1-1/1-2)/Proposal 2 (Proposal 2-1/2-2/2-3/2-4), Proposal 3/Proposal 4, etc.). Further, the corresponding UL DCI may include a conventional SRI field, etc., and the SRI field may coexist with information on the UL TCI state.

For example, the operation of the BS which transits the UL DCI in step S1950 described above may be implemented by the devices in FIGS. 25 to 29 to be described below. For example, referring to FIG. 26, one or more processors 202 may control one or more transceivers 206 and/or one or more memories 204 so as to transmit the UL DCI, and one or more transceivers 206 may transmit the UL DCI from the BS.

The BS may receive, from the UE, the PUSCH transmitted based on information on the UL TCI state (S1960). Here, the information on the UL TCI state may be a UL TCI state indicating a panel/beam for PUSCH transmission. For example, with respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PUSCH transmitted based on the configured/indicated UL TCI state.

For example, the operation of the BS which receives the PUSCH in step S1960 described above may be implemented by the devices in FIGS. 25 to 29 to be described below. For example, referring to FIG. 26, one or more processors 202 may control one or more transceivers 206 and/or one or more memories 204 so as to receive the PUSCH, and one or more transceivers 206 may receive the PUSCH to the BS.

FIG. 20 illustrates a PRACH transmission procedure to which a method proposed in the present disclosure is applied.

Specifically, FIG. 20 illustrates an example of a PRACH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 25 to 29 to be described below). FIG. 20 is just for convenience of the description and does not limit the scope of the present disclosure. Further, some step(s) illustrated in FIG. 20 may be omitted according to a situation and/or a configuration.

Below, the signaling procedure from a UE operation perspective will be described.

The UE may transmit UE capability information to the BS (S2010). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S2010 described above may be implemented by the devices in FIGS. 25 to 29 to be described below. For example, referring to FIG. 26, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S2020). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the UE which receives the UL TCI state related configuration in step S2020 described above may be implemented by the devices in FIGS. 25 to 29 to be described below. For example, referring to FIG. 26, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, an RACH related configuration (e.g., PUCCH-Config, etc.) (S2030). As described above, the corresponding RACH related configuration may be related to a Contention-Free Random Access (CFRA) (e.g., PDCCH-ordered PRACH). The RACH related configuration may include configuration information related to the PRACH transmission of the UE, and may be delivered through higher layer signaling (e.g., RRC signaling), etc. For example, the PRACH related configuration may include configuration and/or indication information for a panel/beam related to the PRACH transmission. As an example, the PRACH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.) (and/or SSB-RI, CRI, etc.), and the corresponding PRACH transmission (e.g., PRACH resource/PRACH preamble). As an example, the UL TCI state may be applied independently from or combinationally with SSB-RI/CRI configured to the PRACH transmission or the SSB-RI/CRI may be replaced with information on the UL TCI state.

For example, the operation of the UE which receives the RACH related configuration in step S2030 described above may be implemented by the devices in FIGS. 25 to 29 to be described below. For example, referring to FIG. 26, one or more processors 102 may control one or more transceivers 106 and/or one or more memories 104 so as to receive the RACH related configuration, and one or more transceivers 106 may receive, from the BS, the RACH related configuration.

The UE may transmit, to the BS, the RACH based on the PRACH related configuration (S2040). As described above, the corresponding PRACH may be related to a Contention-Free Random Access (CFRA) (e.g., PDCCH-ordered PRACH). With respect to the above-described proposal method (e.g., Proposal 1 (Proposal 1-1/1-2)/Proposal 2 (Proposal 2-1/2-2/2-3/2-4), Proposal 3/Proposal, etc.), the UE may transmit, to the BS, the PRACH based on the configured/indicated UL TCI state. That is, the UE may perform an RACH procedure based on the configured/indicated UL TCI state (through a panel(s) a beam(s) indicated by the UL TCI state (e.g., a spatial filter related to a reference RS)).

For example, the operation of the UE which transmits the PRACH in step S2040 described above may be implemented by the devices in FIGS. 25 to 29 to be described below. For example, referring to FIG. 26, one or more processors 102 may control one or more transceivers 106 and/or one or more memories 104 so as to transmit the PRACH, and one or more transceivers 106 may transmit the PRACH to the BS.

Below, the signaling procedure from a BS operation perspective will be described.

The BS may receive UE capability information from the UE (S2010). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S2010 described above may be implemented by devices in FIGS. 25 to 29 to be described below. For example, referring to FIG. 26, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S2020). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 12/13 described above. The UL TCI state related configuration may be delivered through higher layer signaling (e.g., RRC signaling), etc.

For example, the operation of the BS which transmits the UL TCI state related configuration in step S2020 described above may be implemented by the devices in FIGS. 25 to 29 to be described below. For example, referring to FIG. 26, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, an RACH related configuration (e.g., PUCCH-Config, etc.) (S2030). As described above, the corresponding RACH related configuration may be related to a Contention-Free Random Access (CFRA) (e.g., PDCCH-ordered PRACH). The RACH related configuration may include configuration information related to the PRACH transmission of the UE, and may be delivered through higher layer signaling (e.g., RRC signaling), etc. For example, the PRACH related configuration may include configuration and/or indication information for a panel/beam related to the PRACH transmission. As an example, the PRACH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.) (and/or SSB-RI, CRI, etc.), and the corresponding PRACH transmission (e.g., PRACH resource/PRACH preamble). As an example, the UL TCI state may be applied independently from or combinationally with SSB-RI/CRI configured to the PRACH transmission or the SSB-RI/CRI may be replaced with information on the UL TCI state.

For example, the operation of the BS which transmits the RACH related configuration in step S2030 described above may be implemented by the devices in FIGS. 25 to 29 to be described below. For example, referring to FIG. 26, one or more processors 202 may control one or more transceivers 206 and/or one or more memories 204 so as to transmit the RACH related configuration, and one or more transceivers 206 may transmit, to the UE, the RACH related configuration.

The BS may receive, from the UE, the PRACH transmitted based on the PRACH related configuration (S2040). As described above, the corresponding PRACH may be related to a Contention-Free Random Access (CFRA) (e.g., PDCCH-ordered PRACH). With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PRACH transmitted based on the configured/indicated UL TCI state.

That is, the BS may perform the RACH procedure based on the configured/indicated UL TCI state.

For example, the operation of the BS which receives the PRACH in step S2040 described above may be implemented by the devices in FIGS. 25 to 29 to be described below. For example, referring to FIG. 26, one or more processors 202 may control one or more transceivers 206 and/or one or more memories 204 so as to receive the PRACH, and one or more transceivers 206 may receive the PRACH from the UE.

FIG. 21 illustrates a beam reporting procedure to which a method described in the present disclosure is applied.

More specifically, FIG. 21 illustrates an example of signaling between a user equipment (UE) and a base station (BS) based on the above-described proposal methods (e.g., the proposal 5 (the proposals 5-1/5-2/5-3), the proposal 6 (the proposals 6-1/6-2), the proposal 7, etc. related to MPE) (wherein the UE/BS is merely an example and can be replaced by various devices to be described below with reference to FIGS. 25 to 29). FIG. 21 is merely for convenience of description and does not limit a scope of the present disclosure. Further, some step(s) illustrated in FIG. 21 may be omitted depending on situation and/or setting, etc.

Below, the signaling is described from a UE operation perspective.

The UE may receive report configuration information from the BS, in S2110. The report configuration information may be configuration information for beam reporting according to the above-described proposals 5-1, 5-2, 5-3, and 7. For example, the report configuration information may be based on configuration information related to DL beam reporting (e.g., CSI-ReportConfig IE). The report configuration information may include information for a report of a maximum permissible exposure (MPE) related panel. For example, the report configuration information may include information related to an MPE related reporting target (e.g., preferred UL panel/non-preferred UL panel/ power headroom per UL panel/Pcmax per UL panel). The reporting target may be configured based on reportQuantity (e.g., cri-RI-PMI-CQI-preferredULpanel, cri-RI-nonpreferredULpanel-PHRperpanel, cri-RI-CQI-preferredUL-panel-Pcmaxperpanel) (newly added to CSI-ReportConfig).

For example, an operation of the UE to receive the report configuration information from the BS in the step S2110 may be implemented by a device of FIGS. 25 to 29 to be described below. For example, referring to FIG. 26, one or more processors 102 may control one or more transceivers 106 and/or one or more memories 104 so as to receive the report configuration information from the BS, and the one or more transceivers 106 may receive the report configuration information from the BS.

The UE may receive a DL RS from the BS, in S2120. The DL RS may be a DL RS related to the beam reporting according to the above-described proposals 5-1, 5-2, and 5-3. The DL RS may be based on at least one of a channel state information-reference signal (CSI-RS) or a synchronization signal block (SSB). The UE may generate information (e.g., channel state information) for DL beam reporting based on a measurement for the DL RS.

For example, an operation of the UE to receive the DL RS from the BS in the step S2120 may be implemented by the device of FIGS. 25 to 29 to be described below. For example, referring to FIG. 26, one or more processors 102 may control one or more transceivers 106 and/or one or more memories 104 so as to receive the DL RS from the BS, and the one or more transceivers 106 may receive the DL RS from the BS.

The UE may transmit beam reporting information to the BS, in S2130. The beam reporting information may be channel state information (CSI) based on the measurement for the DL RS. In this instance, the beam reporting information may include information (e.g., a list of RS IDs which cannot be configured with DL RS (beam), UL panel, PH, Pcmax, and pathloss reference RS) according to the above-described proposals 5-1, 5-2, 5-3, and 7. For example, the beam reporting information (e.g., CSI) may include information (e.g., explicit panel ID/implicit panel ID) for a preferred UL panel/non-preferred UL panel determined based on the proposal 5-1. In this instance, when the CSI includes beam information per panel (DL RS per panel) (i.e., when a panel-specific DL RS report is performed), the CSI may include an indication representing preference/non-preference for each of reported N beams (e.g., N DL RSs) (e.g., in 1-bit indication, '0'=preferred and '1'=non-preferred). In addition, in a panel specific DL RS report, information related to a non-preferred UL panel (e.g., L1-RSRP/L1-SINR) may be i) excluded from the CSI, or ii) reported as specific codepoint ('0000'). For example, the beam reporting information (e.g., CSI) may include power headroom value or/and Pcmax value (considering P-MPR) per panel according to the proposal 5-2. For example, the beam reporting information (e.g., CSI) may include L1-RSRP/L1-SINR value (or/and an offset value for a reception value in a best Rx panel) when receiving each preferred DL RS (e.g., CRI/SSB-RI) as a best Rx beam of each Rx panel of the UE in accordance with the proposal 5-3. For example, the beam reporting information (e.g., CSI) may include a list of RS IDs which cannot be configured with a reference RS for UL beam or/and a pathloss reference RS for calculating a pathloss compensation value due to an MPE issue in accordance with the proposal 7. The UL scheduling may be performed based on the beam reporting information, and thus the UE may transmit the UL channel/RS to the BS based on the preferred UL panel.

For example, an operation of the UE to transmit the beam reporting information to the BS in the step S2130 may be implemented by the device of FIGS. 25 to 29 to be described below. For example, referring to FIG. 26, one or more processors 102 may control one or more transceivers 106 and/or one or more memories 104 so as to transmit the beam reporting information to the BS, and the one or more transceivers 106 may transmit the beam reporting information to the BS.

Below, the signaling is described from a BS operation perspective.

The BS may transmit report configuration information to the UE, in S2110. The report configuration information may be configuration information for beam reporting according to the above-described proposals 5-1, 5-2, 5-3, and 7. For example, the report configuration information may be based on configuration information related to DL beam reporting (e.g., CSI-ReportConfig IE). The report configuration information may include information for a report of a maximum permissible exposure (MPE) related panel. For example, the report configuration information may include information related to an MPE related reporting target (e.g., preferred UL panel/non-preferred UL panel/power headroom per UL panel/Pcmax per UL panel). The reporting target may be configured based on reportQuantity (e.g., cri-RI-PMI-CQI-preferredULpanel, cri-RI-nonpreferredULpanel-PHRperpanel, cri-RI-CQI-preferredULpanel-Pcmaxperpanel) (newly added to CSI-ReportConfig).

For example, an operation of the BS to transmit the report configuration information to the UE in the step S2110 may be implemented by the device of FIGS. 25 to 29 to be described below. For example, referring to FIG. 26, one or more processors 202 may control one or more transceivers 206 and/or one or more memories 204 so as to transmit the report configuration information to the UE, and the one or more transceivers 206 may transmit the report configuration information to the UE.

The BS may transmit a DL RS to the UE, in S2120. The DL RS may be a DL RS related to the beam reporting according to the above-described proposals 5-1, 5-2, and 5-3. The DL RS may be based on at least one of a channel state information-reference signal (CSI-RS) or a synchronization signal block (SSB). The UE may generate information (e.g., channel state information) for DL beam reporting based on a measurement for the DL RS.

For example, an operation of the BS to transmit the DL RS to the UE in the step S2120 may be implemented by the device of FIGS. 25 to 29 to be described below. For example, referring to FIG. 26, one or more processors 202 may control one or more transceivers 206 and/or one or more memories 204 so as to transmit the DL RS to the UE, and the one or more transceivers 206 may transmit the DL RS to the UE.

The BS may receive beam reporting information from the UE, in S2130. The beam reporting information may be channel state information (CSI) based on the measurement for the DL RS. In this instance, the beam reporting information may include information (e.g., a list of RS IDs which cannot be configured with DL RS (beam), UL panel, PH, Pcmax, and pathloss reference RS) according to the above-described proposals 5-1, 5-2, 5-3, and 7. For example, the beam reporting information (e.g., CSI) may include information (e.g., explicit panel ID/implicit panel ID) for a preferred UL panel/non-preferred UL panel determined based on the proposal 5-1. In this instance, when the CSI includes beam information per panel (DL RS per panel) (i.e., when a panel-specific DL RS report is performed), the CSI may include an indication representing preference/non-preference for each of reported N beams (e.g., N DL RSs) (e.g., in 1-bit indication, '0'=preferred and '1'=non-preferred). In addition, in a panel specific DL RS report, information related to a non-preferred UL panel (e.g., L1-RSRP/L1-SINR) may be i) excluded from the CSI, or ii) reported as specific codepoint (e.g., 4-bit payload '0000'). For example, the beam reporting information (e.g., CSI) may include power headroom value or/and Pcmax value (considering P-MPR) per panel according to the proposal 5-2. For example, the beam reporting information (e.g., CSI) may include L1-RSRP/L1-SINR value (or/and an offset value for a transmission value in a best Rx panel) when receiving each preferred DL RS (e.g., CRI/SSB-RI) as a best Rx beam of each Rx panel of the BS in accordance with the proposal 5-3. For example, the beam reporting information (e.g., CSI) may include a list of RS IDs which cannot be configured with a reference RS for UL beam or/and a pathloss reference RS for calculating a pathloss compensation value due to an MPE issue in accordance with the proposal 7. The UL scheduling may be performed based on the beam reporting information, and thus the BS may receive, from the UE, the transmitted UL channel/RS based on the preferred UL panel.

For example, an operation of the BS to receive the beam reporting information from the UE in the step S2130 may be implemented by the device of FIGS. 25 to 29 to be described below. For example, referring to FIG. 26, one or more processors 202 may control one or more transceivers 206 and/or one or more memories 204 so as to receive the beam reporting information from the UE, and the one or more transceivers 206 may receive the beam reporting information from the UE.

FIG. 22 illustrates a scheduling request procedure to which a method described in the present disclosure is applied.

More specifically, FIG. 22 illustrates an example of signaling between a user equipment (UE) and a base station (BS) based on the above-described proposal methods (e.g., the proposal 5 (the proposals 5-1/5-2/5-3), the proposal 6 (the proposals 6-1/6-2), the proposal 7, etc. related to MPE) (wherein the UE/BS is merely an example and can be replaced by various devices to be described below with reference to FIGS. 25 to 29). FIG. 22 is merely for convenience of description and does not limit a scope of the present disclosure. Further, some step(s) illustrated in FIG. 22 may be omitted depending on situation and/or setting, etc.

Below, the signaling is described from a UE operation perspective.

The UE may receive report configuration information from the BS, in S2210. The report configuration information may be configuration information for reporting according to the above-described proposals 6-1, 6-2, and 7. The report configuration information may be based on configuration information related to scheduling request (e.g., SchedulingRequestConfig IE/SchedulingRequestId IE/SchedulingRequestResourceConfig IE). The report configuration information may include information for a report of a maximum permissible exposure (MPE) related panel. For example, according to the above-described proposals 6-1, 6-2, and 7, the report configuration information may include an SR ID for a report of a list of RS IDs which cannot be configured with preferred UL panel/non-preferred UL panel/power headroom per UL panel/Pcmax per UL panel/pathloss reference RS. Further, the report configuration information may include information for resources for the report. The resource for the report may be based on PUCCH resource/PRACH resource, and the PUCCH resource/PRACH resource may be configured per UL panel.

For example, an operation of the UE to receive the report configuration information from the BS in the step S2210 may be implemented by the device of FIGS. 25 to 29 to be described below. For example, referring to FIG. 26, one or more processors 102 may control one or more transceivers 106 and/or one or more memories 104 so as to receive the report configuration information from the BS, and the one or more transceivers 106 may receive the report configuration information from the BS.

The UE may transmit a scheduling request to the BS, in S2220. The scheduling request may be transmitted based on the above-described proposal 6-1. For example, the scheduling request may be transmitted via a PUCCH resource based on the existing SR event. In this instance, the scheduling request may additionally include information on the above-described list of RS IDs which cannot be configured with preferred UL panel/non-preferred UL panel/power headroom per UL panel/Pcmax per UL panel/pathloss reference RS, in addition to information included in the existing SR. For example, the scheduling request may be transmitted via a dedicated (SR) PUCCH resource based on an MPE related event (e.g., a case in which the UL scheduling is performed on the UL panel based on i) to vi) of the above-described proposal 5-1). In this instance, the scheduling request may include only information on the above-described list of RS IDs which cannot be configured with preferred UL panel/non-preferred UL panel/power headroom per UL panel/Pcmax per UL panel/pathloss reference RS. The power headroom per UL panel/Pcmax per UL panel may be included in the scheduling request, only when an event according to the proposal 6-2 occurs.

For example, an operation of the UE to transmit the scheduling request to the BS in the step S2220 may be implemented by the device of FIGS. 25 to 29 to be described below. For example, referring to FIG. 26, one or more processors 102 may control one or more transceivers 106 and/or one or more memories 104 so as to transmit the scheduling request to the BS, and the one or more transceivers 106 may transmit the scheduling request to the BS.

The UE may receive an UL grant from the BS, in S2230. The UL grant may be based on DCI scheduling a PUSCH. The DCI may include information for at least one of the preferred UL panels reported via the scheduling request.

For example, an operation of the UE to receive the UL grant from the BS in the step S2230 may be implemented by the device of FIGS. 25 to 29 to be described below. For example, referring to FIG. 26, one or more processors 102 may control one or more transceivers 106 and/or one or more memories 104 so as to receive the UL grant from the BS, and the one or more transceivers 106 may receive the UL grant from the BS.

The UE may transmit UL data to the BS, in S2240. The UL data may be transmitted via the PUSCH resource scheduled based on the UL grant. In this instance, the UE may transmit the UL data to an UL panel (i.e., a preferred UL panel) based on the UL grant. Thus, an MPE issue does not occur upon the UL data transmission.

For example, an operation of the UE to transmit the UL data to the BS in the step S2240 may be implemented by the device of FIGS. 25 to 29 to be described below. For example, referring to FIG. 26, one or more processors 102 may control one or more transceivers 106 and/or one or more memories 104 so as to transmit the UL data to the BS, and the one or more transceivers 106 may transmit the UL data to the BS.

Below, the signaling is described from a BS operation perspective.

The BS may transmit report configuration information to the UE, in S2210. The report configuration information may be configuration information for reporting according to the above-described proposals 6-1, 6-2, and 7. The report configuration information may be based on configuration information related to scheduling request (e.g., SchedulingRequestConfig IE/SchedulingRequestId IE/SchedulingRequestResourceConfig IE). The report configuration information may include information for a report of a maximum permissible exposure (MPE) related panel. For example, according to the above-described proposals 6-1, 6-2, and 7, the report configuration information may include an SR ID for a report of a list of RS IDs which cannot be configured with preferred UL panel/non-preferred UL panel/power headroom per UL panel/Pcmax per UL panel/pathloss reference RS. Further, the report configuration information may include information for resources for the report. The resource for the report may be based on PUCCH resource/PRACH resource, and the PUCCH resource/PRACH resource may be configured per UL panel.

For example, an operation of the BS to transmit the report configuration information to the UE in the step S2210 may be implemented by the device of FIGS. 25 to 29 to be described below. For example, referring to FIG. 26, one or more processors 202 may control one or more transceivers 206 and/or one or more memories 204 so as to transmit the report configuration information to the UE, and the one or more transceivers 206 may transmit the report configuration information to the UE.

The BS may receive a scheduling request from the UE, in S2220. The scheduling request may be transmitted based on the above-described proposal 6-1. For example, the scheduling request may be transmitted via a PUCCH resource based on the existing SR event. In this instance, the scheduling request may additionally include information on the above-described list of RS IDs which cannot be configured with preferred UL panel/non-preferred UL panel/power headroom per UL panel/Pcmax per UL panel/pathloss reference RS, in addition to information included in the existing SR. For example, the scheduling request may be transmitted via a dedicated (SR) PUCCH resource based on an MPE related event (e.g., a case in which the UL scheduling is performed on the UL panel based on i) to vi) of the above-described proposal 5-1). In this instance, the scheduling request may include only information on the above-described list of RS IDs which cannot be configured with preferred UL panel/non-preferred UL panel/power headroom per UL panel/Pcmax per UL panel/pathloss reference RS. The power headroom per UL panel/Pcmax per UL panel may be included in the scheduling request, only when an event according to the proposal 6-2 occurs.

For example, an operation of the BS to receive the scheduling request from the UE in the step S2220 may be implemented by the device of FIGS. 25 to 29 to be described below. For example, referring to FIG. 26, one or more processors 202 may control one or more transceivers 206 and/or one or more memories 204 so as to receive the scheduling request from the UE, and the one or more transceivers 206 may receive the scheduling request from the UE.

The BS may transmit an UL grant to the UE, in S2230. The UL grant may be based on DCI scheduling a PUSCH. The DCI may include information for at least one of the preferred UL panels reported via the scheduling request.

For example, an operation of the BS to transmit the UL grant to the UE in the step S2230 may be implemented by the device of FIGS. 25 to 29 to be described below. For example, referring to FIG. 26, one or more processors 202 may control one or more transceivers 206 and/or one or more memories 204 so as to transmit the UL grant to the UE, and the one or more transceivers 206 may transmit the UL grant to the UE.

The BS may receive UL data from the UE, in S2240. The UL data may be transmitted via the PUSCH resource scheduled based on the UL grant. In this instance, the BS may receive the UL data transmitted to an UL panel (i.e., a preferred UL panel) based on the UL grant. Thus, an MPE issue does not occur when the UE transmits the UL data.

For example, an operation of the BS to receive the UL data from the UE in the step S2240 may be implemented by the device of FIGS. 25 to 29 to be described below. For example, referring to FIG. 26, one or more processors 202 may control one or more transceivers 206 and/or one or more memories 204 so as to receive the UL data from the UE, and the one or more transceivers 206 may receive the UL data from the UE.

The above-described operations according to FIGS. 17 to 22 have been described focusing on some of the proposals (the proposals 1 to 7) described in the present disclosure for convenience of the description, but it does not mean the remaining proposals cannot be applied together to the operations. For example, the operation according to FIG. 17 has been mainly described based on the proposals 1 to 4, but the methods according to one or more of the proposals 5 to 7 can be combined and additionally applied. For example, the operation according to FIG. 21 has been mainly described based on the proposals 5 to 7, but the methods according to one or more of the proposals 1 to 4 can be combined and additionally applied.

As mentioned above, the above-described UE operation and/or BS operation (e.g., the proposal 1 (the proposals 1-1/1-2), the proposal 2 (the proposals 2-1/2-2/2-3/2-4), the proposal 3, the proposal 4, the proposal 5 (the proposals 5-1/5-2/5-3), the proposal 6 (the proposals 6-1/6-2), and the proposal 7) may be implemented by a device to be described below (e.g., FIGS. 25 to 29). For example, the UE may correspond to a first wireless device/receiving device, and the BS may correspond to a second wireless device/transmitting device. In some cases, the reverse may also be considered.

The above-described UE operation and/or BS operation (e.g., the proposal 1 (the proposals 1-1/1-2), the proposal 2 (the proposals 2-1/2-2/2-3/2-4), the proposal 3, the proposal 4, the proposal 5 (the proposals 5-1/5-2/5-3), the proposal 6 (the proposals 6-1/6-2), and the proposal 7) may be processed by processors 102/202 of FIG. 26 and/or a controller 120 of FIG. 28/FIG. 29.

The above-described UE operation and/or BS operation (e.g., the proposal 1 (the proposals 1-1/1-2), the proposal 2 (the proposals 2-1/2-2/2-3/2-4), the proposal 3, the proposal 4, the proposal 5 (the proposals 5-1/5-2/5-3), the proposal 6 (the proposals 6-1/6-2), and the proposal 7) may be stored in a memory (e.g., memories 104 and 204 of FIG. 26 and a memory unit 130 of FIG. 28/FIG. 24) in the form of commands/programs (e.g., instruction(s), executable code(s), etc.) for running at least one processor or controller of FIGS. 26/28/29.

Hereinafter, the above-described embodiments are described in detail from a perspective of the UE operation with reference to FIG. 23. Methods to be described below are merely distinguished for convenience of explanation, and thus it is obvious that partial configuration of any method can be substituted or combined with partial configuration of another method.

FIG. 23 is a flow chart illustrating a method for a UE to report a power headroom in a wireless communication system according to an embodiment of the present disclosure.

Referring to FIG. 23, a method for a UE to report a power headroom (PH) in a wireless communication system according to an embodiment of the present disclosure comprises a step S2310 of receiving configuration information related to the power headroom (PH) and a step S2320 of transmitting a message for a report of the power headroom.

In the step S2310, the UE receives, from a BS, the configuration information related to the power headroom. The configuration information related to the power headroom may be transmitted via RRC signalling. For example, the configuration information may be based on PHR-config of Table 7.

According to the step S2310, an operation of the UE (100/200 of FIGS. 25 to 29) to receive the configuration information related to the power headroom (PH) from the BS (100/200 of FIGS. 25 to 29) may be implemented by a device of FIGS. 25 to 29. For example, referring to FIG. 26, one or more processors 102 may control one or more transceivers 106 and/or one or more memories 104 so as to receive the configuration information related to the power headroom from the BS 200.

In the step S2320, the UE transmits, to the BS, the message for the report of the PH.

According to an embodiment, the report of the PH may be triggered based on a pre-configured event. The pre-configured event may occur based on a specific threshold related to maximum permissible exposure (MPE). The specific threshold may be related to the PH or UE maximum output power (Pcmax). The Pcmax may be referred to as configured maximum UE output power.

According to an embodiment, the message for the report of the PH may be based on PHR MAC CE (Power Headroom Report Medium Access Control Control Element).

According to an embodiment, the message for the report of the PH may include information related to P-MPR (Power management-Maximum Power Reduction). The present embodiment may be based on the proposals 5-2 and 6-2.

The information related to P-MPR may include one or more values related to the PH. The one or more values related to the PH may be related to one or more specific indexes.

The one or more specific indexes may be related to at least one of i) a panel, ii) a reference signal (RS), or iii) a transmission configuration indicator (TCI) state.

For example, the one or more specific indexes may be related to a panel ID.

For example, the one or more specific indexes may be related to a resource of the RS. The resource of the RS may be an RS resource mapped to specific codepoint(s) of an UL TCI state field (e.g., 3 bits) according to the proposal 3. For example, the specific codepoint may be mapped to UL TCI state configuration 2(4) of Table 13. An ID of a DL RS according to the UL TCI state configuration 2(4) may be an SSB resource indicator (SSBRI) or a CSI-RS resource indicator (CRI) as defined in a DL BM Procedure.

The resource of the RS may be related to at least one of a channel state information-reference signal (CSI-RS) or a synchronization signal block (SSB).

For example, the one or more specific indexes may be related to an uplink transmission configuration indicator (UL TCI) state. The UL TCI state may be based on at least one of embodiments according to the above-described proposals 1 to 4.

According to an embodiment, the one or more values related to the PH may be related to power backoff for meeting MPE requirements.

For example, the one or more values related to the PH may include Pcmax to which the power backoff is applied so as to meet the MPE requirements.

For example, the one or more values related to the PH may include a PH value per panel in which the P-MPR is considered.

For example, the one or more values related to the PH may include a value (e.g., P-MPR value) applied for the power backoff. As a detailed example, P-MPR value of x dB (e.g., 6 dB) may be included in the message for the report of the PH.

According to the step S2320, an operation of the UE (100/200 of FIGS. 25 to 29) to transmit the message for the report of the PH to the BS (100/200 of FIGS. 25 to 29) may be implemented by the device of FIGS. 25 to 29. For example, referring to FIG. 26, one or more processors 102 may control one or more transceivers 106 and/or one or more memories 104 so as to transmit the message for the report of the PH to the BS 200.

Hereinafter, the above-described embodiments are described in detail from a perspective of the BS operation with reference to FIG. 24. Methods to be described below are merely distinguished for convenience of explanation, and thus it is obvious that partial configuration of any method can be substituted or combined with partial configuration of another method.

FIG. 24 is a flow chart illustrating a method for a base station to receive a report for power headroom in a wireless communication system according to another embodiment of the present disclosure.

Referring to FIG. 24, a method for a base station (BS) to receive a report for power headroom in a wireless communication system according to another embodiment of the present disclosure comprises a step S2410 of transmitting configuration information related to the power headroom (PH) and a step S2420 of receiving a message for a report of the power headroom.

In the step S2410, the BS transmits, to a UE, the configuration information related to the power headroom. The configuration information related to the power headroom may be transmitted via RRC signalling. For example, the configuration information may be based on PHR-config of Table 7.

According to the step S2410, an operation of the BS (100/200 of FIGS. 25 to 29) to transmit the configuration information related to the power headroom (PH) to the UE (100/200 of FIGS. 25 to 29) may be implemented by a device of FIGS. 25 to 29. For example, referring to FIG. 26, one or more processors 202 may control one or more transceivers 206 and/or one or more memories 204 so as to transmit the configuration information related to the power headroom to the UE 100.

In the step S2420, the BS receives, from the UE, the message for the report of the PH.

According to an embodiment, the report of the PH may be triggered based on a pre-configured event. The pre-configured event may occur based on a specific threshold related to maximum permissible exposure (MPE). The specific threshold may be related to the PH or UE maximum output power (Pcmax). The Pcmax may be referred to as configured maximum UE output power.

According to an embodiment, the message for the report of the PH may be based on PHR MAC CE.

According to an embodiment, the message for the report of the PH may include information related to P-MPR (Power management-Maximum Power Reduction). The present embodiment may be based on the proposals 5-2 and 6-2.

The information related to P-MPR may include one or more values related to the PH. The one or more values related to the PH may be related to one or more specific indexes.

The one or more specific indexes may be related to at least one of i) a panel, ii) a reference signal (RS), or iii) a transmission configuration indicator (TCI) state.

For example, the one or more specific indexes may be related to a panel ID.

For example, the one or more specific indexes may be related to a resource of the RS. The resource of the RS may be an RS resource mapped to specific codepoint(s) of an UL TCI state field (e.g., 3 bits) according to the proposal 3. For example, the specific codepoint may be mapped to UL TCI state configuration 2(4) of Table 13. An ID of a DL RS according to the UL TCI state configuration 2(4) may be an SSB resource indicator (SSBRI) or a CSI-RS resource indicator (CRI) as defined in a DL BM procedure.

The resource of the RS may be related to at least one of a channel state information-reference signal (CSI-RS) or a synchronization signal block (SSB).

For example, the one or more specific indexes may be related to an uplink transmission configuration indicator (UL TCI) state. The UL TCI state may be based on at least one of embodiments according to the above-described proposals 1 to 4.

According to an embodiment, the one or more values related to the PH may be related to power backoff for meeting MPE requirements.

For example, the one or more values related to the PH may include Pcmax to which the power backoff is applied so as to meet the MPE requirements.

For example, the one or more values related to the PH may include a PH value per panel in which the P-MPR is considered.

For example, the one or more values related to the PH may include a value (e.g., P-MPR value) applied for the power backoff. As a detailed example, P-MPR value of x dB (e.g., 6 dB) may be included in the message for the report of the PH.

According to the step S2410, an operation of the BS (100/200 of FIGS. 25 to 29) to receive the message for the report of the PH from the UE (100/200 of FIGS. 25 to 29) may be implemented by the device of FIGS. 25 to 29. For example, referring to FIG. 26, one or more processors 202 may control one or more transceivers 206 and/or one or more memories 204 so as to receive the message for the report of the PH from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 25 illustrates a communication system 1 applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 26 illustrates wireless devices applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 27 illustrates a signal process circuit for a transmission signal.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 28 illustrates another example of a wireless device applied to the present disclosure.

The wireless device may be implemented in various forms according to a use-case/service (refer to FIG. 25). Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 25), the vehicles (100*b*-1 and 100*b*-2 of FIG. 25), the XR device (100*c* of FIG. 25), the hand-held device (100*d* of FIG. 25), the home appliance (100*e* of FIG. 25), the IoT device (100*f* of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 29 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit

110. Blocks 110 to 130/140*a* to 140*c* correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a micro-phone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firm-ware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, con-trollers, microcontrollers, microprocessors, etc.

In a firmware or software configuration, the embodiments of the present disclosure may be implemented in the form of a module, a procedure, a function, etc. For example, soft-ware code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method comprising:

receiving, by a user equipment (UE) from a base station, configuration information related to a power headroom (PH); and based on a Power Headroom Report (PHR) being trig-gered, transmitting, by the UE to the base station, a PHR Medium Access Control Control Element (PHR MAC CE), wherein the PHR is triggered based on an event that occurs based on a threshold related to maximum per-missible exposure (MPE), wherein the PHR MAC CE includes information related to Power management-Maximum Power Reduction (P-MPR), wherein the information related to the P-MPR includes one or more values which are related to a power backoff to meet MPE requirements, wherein the one or more values are related to one or more specific indexes, wherein the method further comprises:

transmitting, by the UE to the base station, channel state information (CSI) that includes information related to Sounding Reference Signal (SRS) resource sets, wherein the SRS resource sets are related to panels determined by a condition related to the MPE and the panels include at least one preferred panel and/or at least one non-preferred panel.

2. The method of claim 1, wherein the one or more specific indexes are related to one or more reference signal, RS, resources.

3. The method of claim 2, wherein the one or more RS resources is related to at least one of a channel state information-reference signal (CSI-RS) or a synchronization signal block (SSB).

4. The method of claim 1, wherein the threshold is related to the PH or a UE maximum output power (Pcmax).

5. A user equipment (UE) comprising:

one or more transceivers;

one or more processors configured to control the one or more transceivers; and one or more memories operably connected to the one or more processors, wherein the one or more memories store instructions, that are configured to allow the one or more processors to perform operations, based on being executed by the one or more processors, wherein the operations comprise:

receiving configuration information related to a power headroom (PH); and based on a Power Headroom Report (PHR) being trig-gered, transmitting a PHR Medium Access Control Control Element (PHR MAC CE), wherein the PHR is triggered based on an event that occurs based on a threshold related to maximum permissible exposure (MPE), wherein the PHR MAC CE includes information related to Power management-Maximum Power Reduction (P-MPR), wherein the information related to the P-MPR includes one or more values which are related to a power backoff to meet MPE requirements, wherein the one or more values are related to one or more specific indexes, wherein the operations further comprises:

transmitting, to a base station, channel state information (CSI) that includes information related to Sounding Reference Signal (SRS) resource sets, wherein the SRS resource sets are related to panels determined by a condition related to the MPE and the panels include at least one preferred panel and/or at least one non-preferred panel.

6. A base station comprising:

one or more transceivers;

one or more processors configured to control the one or more transceivers; and one or more memories operably connected to the one or more processors, wherein the one or more memories store instructions, that are configured to allow the one or more processors to perform operations, based on being executed by the one or more processors, wherein the operations comprise:

transmitting, to a user equipment (UE), configuration information related to a power headroom (PH); and based on a Power Headroom Report (PHR) being triggered, receiving, from the UE, a PHR Medium Access Control Control Element (PHR MAC CE), wherein the PHR is triggered based on an event that occurs based on a threshold related to maximum permissible exposure (MPE), wherein the PHR MAC CE includes information related to Power management-Maximum Power Reduction (P-MPR), wherein the information related to the P-MPR includes one or more values which are related to a power backoff to meet MPE requirements, wherein the one or more values are related to one or more specific indexes, wherein the operations further comprises:

receiving, from the UE, channel state information (CSI) that includes information related to Sounding Reference Signal (SRS) resource sets, wherein the SRS resource sets are related to panels determined by a condition related to the MPE and the panels include at least one preferred panel and/or at least one non-preferred panel.

* * * * *